US012615291B2

(12) United States Patent
Casper

(10) Patent No.: US 12,615,291 B2
(45) Date of Patent: Apr. 28, 2026

(54) WEB RESOURCE RECOGNITION

(71) Applicant: Citrix Systems, Inc., Ft. Lauderdale, FL (US)

(72) Inventor: Ryan Matthew Casper, Conway, AR (US)

( * ) Notice: Subject to any disclaimer, the term of this patent is extended or adjusted under 35 U.S.C. 154(b) by 936 days.

(21) Appl. No.: 17/457,530

(22) Filed: Dec. 3, 2021

(65) Prior Publication Data

US 2023/0179626 A1 Jun. 8, 2023

(51) Int. Cl.
*H04L 9/40* (2022.01)

(52) U.S. Cl.
CPC .......... *H04L 63/1483* (2013.01); *H04L 63/10* (2013.01)

(58) Field of Classification Search
CPC ............................ H04L 63/10; H04L 63/1483
See application file for complete search history.

(56) References Cited

U.S. PATENT DOCUMENTS 10,462,180 B1 * 10/2019 Ben David ......... H04L 63/0823
2009/0043774 A1 * 2/2009 Sudhakar ............ G06F 16/1873
707/999.009

OTHER PUBLICATIONS

Safe Links in Microsoft Defender for Office 365 downloaded from https://docs.microsoft.com/en-us/microsoft-365/security/office-365-security/safe-links as captured by the Wayback Machine on Sep. 10, 2021 (21 pages).

* cited by examiner

*Primary Examiner* — Emmanuel L Moise
*Assistant Examiner* — Xiang Yu

(57) ABSTRACT

A computer system is provided. The system includes a memory, a user interface, and a processor coupled with the at least one memory and the at least one user interface. The processor is configured to detect an electronic communication to a user comprising one or more links that address one or more web resources, determine whether each link of the one or more links addresses a recognized web resource or an unrecognized web resource, replace each link that addresses an unrecognized web resource with a replacement link that addresses a predetermined web page, and render the electronic communication to the user via a user interface.

20 Claims, 15 Drawing Sheets

WEB RESOURCE RECOGNITION

BACKGROUND

Anti-phishing software attempts to identify and block phishing content prior to its presentation to a user. Phishing content can include executable and non-executable content that is designed to elicit personal information, such as security credentials, account numbers, and the like, from users for nefarious purposes. Some anti-phishing software traces links presented in content to determine whether the links lead to known phishing websites. Other anti-phishing software uses artificial intelligence and computer vision to monitor communications and user activity to identify phishing content.

SUMMARY

In one example, a method for protecting users from phishing attacks via web resource recognition is provided. The method includes detecting an electronic communication to a user including one or more links that address one or more web resources; determining that at least one link of the one or more links addresses an unrecognized web resource; replacing the at least one link with at least one replacement link that addresses a predetermined web page; and rendering the electronic communication to the user via a user interface.

Examples of the method can include one or more of the following features.

In the method, determining that the at least one link of the one or more links addresses an unrecognized web resource can include extracting one or more domains from the one or more links and comparing the one or more domains to a list of recognized domains. Comparing the one or more domains to the list of recognized domains can include comparing the one or more domains to a list of recognized domains generated from browser data associated with the user.

The method can further include receiving input from the user selecting the at least one replacement link; rendering the predetermined web page in response to reception of the input, the predetermined web page including one or more prompts for additional input; and receiving the additional input via the one or more prompts. In the method, receiving the additional input can include receiving input requesting administrative review of the unrecognized web resource and initiating the administrative review in response to reception of the additional input. In the method, receiving the additional input can include receiving input requesting access to a constrained version of the unrecognized web resource; generating a constrained version of the unrecognized web resource; and rendering the constrained version via the user interface. The method can further include receiving input from an administrator specifying a policy to control access to the constrained version and controlling access to the constrained version based on the policy. Generating the constrained version can include generating an image of the unrecognized web resource. Detecting the electronic communication can include detecting one or more of an email or an instant message. Detecting the electronic communication can include detecting the electronic communication at a server.

In one example, a computer system is provided. The computer system includes at least one memory; at least one user interface; and at least one processor coupled with the at least one memory and the at least one user interface. The at least one processor is configured to detect an electronic communication to a user including one or more links that address one or more web resources, determine whether each link of the one or more links addresses a recognized web resource or an unrecognized web resource, replace each link that addresses an unrecognized web resource with a replacement link that addresses a predetermined web page, and render the electronic communication to the user via a user interface.

Examples of the computer system can include one or more of the following features.

In the computer system, to determine whether each link of the one or more links addresses a recognized web resource or an unrecognized web resource can include to extract one or more domains from the one or more links and to compare the one or more domains to a list of recognized domains associated with the user. The electronic communication can include at least one replacement link and the at least one processor can be further configured to receive input from the user that selects the replacement link, render the predetermined web page in response to reception of the input, the predetermined web page including one or more prompts for additional input, and receive the additional input via the one or more prompts.

In the computer system, the additional input can include input that requests administrative review of at least one unrecognized web resource specified in the at least one replacement link and the at least one processor can be configured to initiate the administrative review in response to reception of the additional input. The additional input can include input that requests access to a constrained version of at least one unrecognized web resource specified in the at least one replacement link and the at least one processor is configured to generate a constrained version of the unrecognized web resource; and render the constrained version via the user interface.

In one example, a non-transitory computer readable medium is provided. The computer readable medium stores processor executable instructions to recognize web resources. The instructions can include instructions to detect an electronic communication to a user including one or more links that address one or more web resources; determine whether each link of the one or more links addresses a recognized web resource or an unrecognized web resource; replace each link that addresses an unrecognized web resource with a replacement link that addresses a predetermined web page; and render the electronic communication to the user via a user interface.

Examples of the non-transitory computer readable medium can include one or more of the following features.

The instructions to determine whether each link of the one or more links addresses a recognized web resource or an unrecognized web resource can include instructions to extract one or more domains from the one or more links; and compare the one or more domains to a list of recognized domains associated with the user. In the non-transitory computer readable medium, the electronic communication can include at least one replacement link and the instructions can include instructions to receive input from the user that selects the replacement link, render the predetermined web page in response to reception of the input, the predetermined web page including one or more prompts for additional input, and receive the additional input via the one or more prompts. The additional input can include input that requests administrative review of at least one unrecognized web resource specified in the at least one replacement link and the instructions can include instructions to initiate the administrative review in response to reception of the additional input. The additional input can include input that requests access to a constrained version of at least one unrecognized web resource specified in the at least one replacement link and the instructions include instructions to generate a constrained version of the unrecognized web resource and render the constrained version via the user interface.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, identical or nearly identical components that are illustrated in various figures are represented by like numerals. For purposes of clarity, not every component may be labeled in every figure.

DETAILED DESCRIPTION

Figure 1:
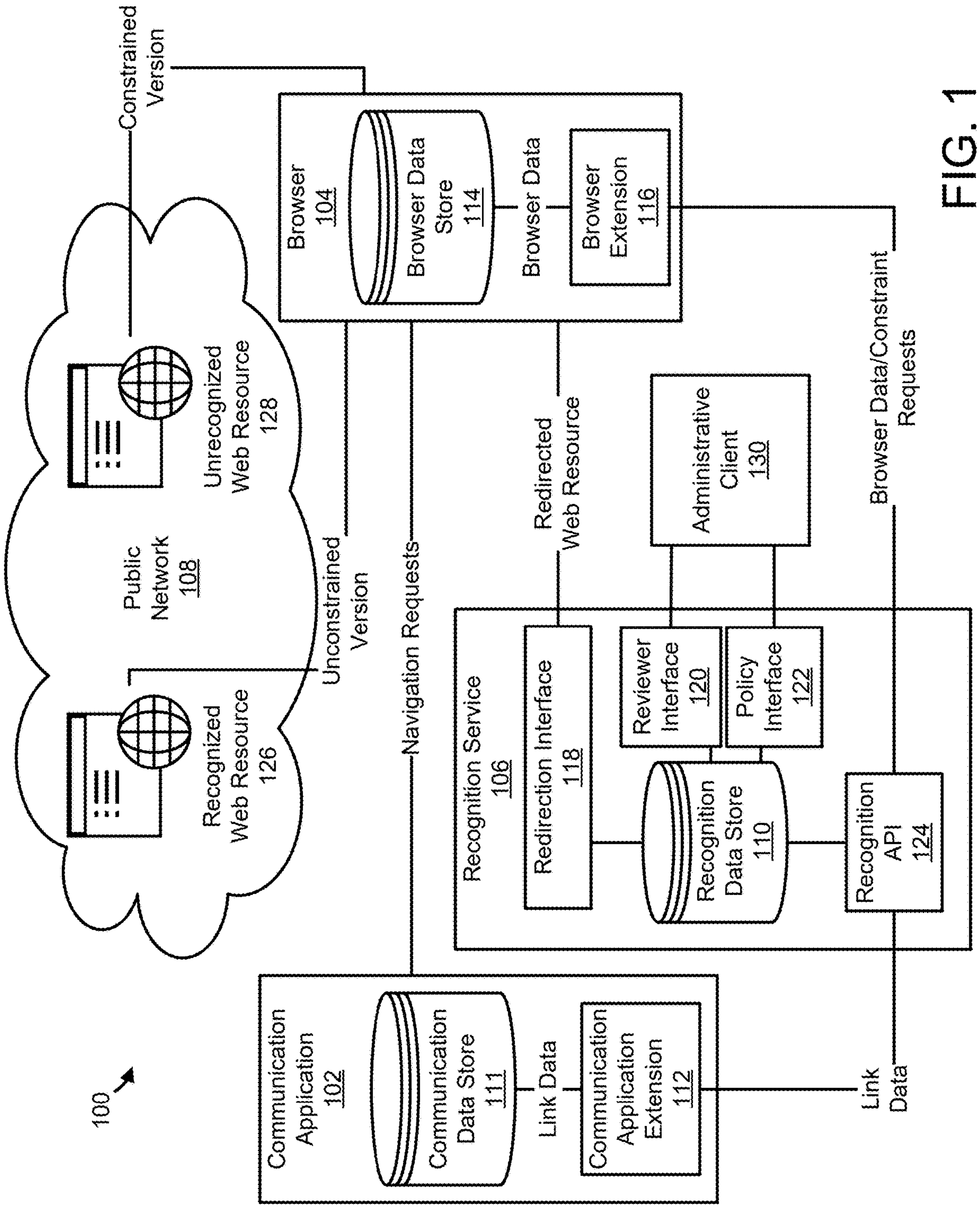
FIG. 1 is a block diagram of a web resource recognition system in accordance with an example of the present disclosure.

As summarized above, at least some examples described herein are directed to systems and methods that help defend against phishing attacks by monitoring communications to users for embedded links to unrecognized web resources. These embedded links can include, for example, uniform resource locators (URLs) that address a wide variety of web resources accessible via various protocols, such as hypertext markup language (HTML) documents accessible via hypertext transport protocol (HTTP), secure HTML documents accessible HTTP secure (HTTPS), image files assessible via file transport protocol (FTP), and other digital content. By monitoring for embedded links to unrecognized web resources, the systems and methods described herein can draw attention to links that address unrecognized web resources and thereby degrade the ability to use links for nefarious purposes, such as to draw users to phishing websites masquerading as legitimate websites.

Through phishing websites, attackers seek to trick a victim into disclosing or otherwise providing access to valuable information, such as financial information, security credentials, and contact information for friends, colleagues, and/or customers of the victim. A common vehicle for a phishing attack is a link embedded in an email, instant message, or some other form of electronic communication. When receiving such a communication, it is often difficult to determine whether the communication is legitimate or a well-crafted illegitimate phishing attack disguised as originating from a legitimate source. Users will often click on links in these communications or open attachments, thinking the content is trustworthy. Instead interacting with the content activates a malicious program or provides sensitive information to the attacker.

For instance, if such a link is selected by a user of a computing device, an operating system executed by the computing device can launch a browser and provide the link to the browser. In response, the browser can follow the link and load a malicious web page or other resource. The malicious web page can, for example, prompt the user to provide valuable information, download and execute automation that monitors for and/or retrieves valuable information, or otherwise gain access to valuable information. Once such valuable information is identified and/or collected, the malicious web page can provide the valuable information to the attacker and/or restrict access to the valuable information until the victim pays a ransom.

Methods exist today to help identify phishing attacks and protect users. Unfortunately, these methods have disadvantages. Digital signatures on electronic communications haven't achieved widespread adoption and don't have enough standard representation in application user interfaces to provide much benefit in most consumer and commercial use cases. Automated message classification techniques catch old approaches but are weak at protecting against novel approaches or spear-phishing attacks.

To address phishing attacks, as well as other issues, web resource recognition systems and processes are provided. These systems and processes monitor communications to user-facing communication programs for links to external resources. Where such links are detected, the web resource recognition systems and processes described herein determine whether the links address recognized or unrecognized web resources. In some examples, the web resource recognition systems and processes make these determinations by identifying web resources accessible via the links and comparing identified resources to a list of safe web resources. In these examples, the web resource recognition systems can build the list of safe resources from browser data (e.g., browser history) detailing web resources previously accessed by a user, browser data specifying credentials used to access web resources, and/or policy data entered by administrative personnel.

Further, in certain examples, the web resource recognition systems and processes replace links to unrecognized web resources with links that redirect to a web resource designated by policy. In some examples, this designated resource includes a web page that encodes prompts to the user for additional information. The web page can request, for instance, information specifying whether the user believes the web resource has been previously visited and/or whether the user wants to continue to load the web resource. Based on the additional information entered by the user, the web resource recognition systems and processes can initiate an administrative review of an unrecognized web resource, load a constrained view of the unrecognized web resource, and/or prevent loading of the unrecognized web resource.

The web resource recognition systems and processes described herein can be implemented within a variety of computing resources. For instance, in some examples, the web resource recognition systems and processes are implemented within a browser and/or a browser extension. Moreover, in some examples, the systems and processes are implemented within a virtualization infrastructure, such as the HDX™ virtualization infrastructure commercially available from Citrix Systems of Fort Lauderdale, Florida, in the United States. In these examples, the web resource recognition systems and processes can be implemented within a digital workspace application, such as the Citrix Workspace™ application; a browser embedded within the digital workspace application; a secure browser service, such as the Citrix Secure Browser™ service; a gateway appliance, such as the Citrix Application Delivery Controller™ (ADC); a virtualization agent, and/or other computing resources.

Once installed and integrated, the systems and methods described herein reduce the number of phishing attacks that succeed easily-through increased user awareness as well as extra defensive measures and approval. Moreover, the systems and methods described herein offer a series of extra mitigations in high risk or high sensitivity scenarios. The extra time and steps introduced slow high-volume phishing attacks to offer time for other defensive measures to recognize patterns while minimizing pain to user productivity. Usability is not impacted negatively in cases where the user is using their most commonly visited sites.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Web Resource Recognition System

In some examples, a web resource recognition system is configured to monitor electronic communications directed to and readable by a user for embedded links that may be the tip of a phishing attack. Where an embedded link is detected, the web resource recognition system identifies the web resource addressed by the link and determines whether the web resource is recognized (i.e., safe) or unrecognized (i.e., unsafe) for the user. Where the web resource is unrecognized, the web resource recognition system executes a protective operation, such as replacing the link with a link that redirects to a predetermined web resource. The predetermine web resource can include, for instance, a web page that prompts the user for additional information. The protective operation can further include initiating an administrative review of the unrecognized web resource, loading a safely constrained version of the unrecognized web resource, and/or otherwise preventing the unrecognized web resource from being loaded. Where the web resource is recognized, the web resource recognition system executes no protective operations but rather allows browser navigation and processing to execute normally. FIG. 1 illustrates a logical architecture of a web resource recognition system 100 in accordance with these examples.

As shown in FIG. 1, the system 100 includes a communication application 102, a browser 104, a web resource recognition service 106, a public network 108, and an administrative client 130. The communication application 102 includes a communication data store 111 and a communication application extension 112. The browser 104 includes a browser data store 114 and a browser extension 116. The recognition service 106 includes a redirection interface 118, a reviewer interface 120, a policy interface 122, a recognition application programming interface (API) 124, and a recognition data store 110. The public network 108 includes recognized web resource 126 and unrecognized web resource 128. FIG. 1 also illustrates lines of communication between computer-implemented processes. Additional details regarding these and other communications are provided below, but it should be noted that the depicted lines of communication can include inter-process communication (e.g., where two or more of the computer-implemented processes illustrated in FIG. 1 reside within the same execution environment) and network-based communication (e.g., where two or more of the processes reside in different execution environments coupled to one another by a computer network).

Continuing with examples illustrated by FIG. 1, the communication application 102 is configured to receive and store electronic communications directed to a user. Examples of the communication application 102 include an email program, an instant messaging program, a groupware program, and an online meeting program, to name a few. Commercially available examples of communication applications include MICROSOFT OUTLOOK (from Microsoft of Redmond, Washington in the United States), GOOGLE GMAIL (from Google LLC of Mountain View, California in the United States), MICROSOFT TEAMS (from Microsoft), SLACK (from Slack Technologies of San Francisco, California in the United States), ZOOM (from Zoom of San Jose, California in the United States), and the like. The communication application 102 can include a client program and/or a server program in various examples. As shown in FIG. 1, the communication application extension 112 included within the communication application 102 is configured to interoperate (e.g., via one or more APIs) with the communication data store 111 to retrieve link data from messages stored in the communication data store 111. In this regard, the communication application extension 112 can periodically poll the communication data store 111 for new messages and scan the new messages for embedded links. Alternatively or additionally, the communication application extension 112 can subscribe to receive notifications of new messages as the new messages are received by the communication application 102 and/or are stored in the communication data store 111 and to scan the new messages for embedded links. In some examples, the communication application extension 112 is configured to interoperate (e.g., via API calls to the recognition API 124) with the recognition service 106 to determine whether the embedded links are safe (e.g., the links point to recognized web resources) or unsafe (e.g., the links point to unrecognized web resources) for the user and to replace unsafe links with a replacement link that redirects to a web resource (e.g., a predetermined web page) to collect additional information. Further details of example processes that the communication application extension 112 is configured to execute are described further below with reference to FIGS. 2A and 3D.

Continuing with examples illustrated by FIG. 1, the browser 104 is configured to receive links to web resources and to load and process the web resources. The type of processing executed by the browser depends on the type of web resource. For instance, where the web resource is a web page, the browser 104 renders HTML content included within the web page via a user interface and/or executes instructions (e.g., JavaScript) included within the web page. Where the web resource is an image file stored on an FTP server, the browser 104 interoperates with the FTP server to receive the image file. Examples of the browser include independent, commercially available browsers (e.g., the CHROME browser available from Google LLC) and embedded browsers (e.g., a browser based on the CHROMIUM open source project supported by Google LLC). As shown in FIG. 1, the browser extension 116 included in the browser 104 is configured to interoperate with the browser data store 114 to retrieve browser data stored therein. This browser data can include, for example, URL strings derived from browser history associated with a user and or URL strings derived from associations between account credentials of the user and URLs. These URL strings can specify previously accessed and/or authorized URLs or portions thereof (e.g., domains) that are associated with the user. In some examples, the browser extension 116 is configured to retrieve the browser data during initial installation and to update the browser data under administrative control (e.g., in response to a command issued by an administrative user). In these examples, the browser extension 116 is configured to transmit the retrieved browser data to the recognition data store 110 for storage therein via one or more API calls to the recognition API 124.

In some examples, the browser extension 116 is configured to retrieve browser data dated later than a configurable threshold date (e.g., an absolute date and/or a date relative to the current date). This configurable threshold date can be URL specific, in certain examples. Further, in some examples, the browser extension 116 is configured to hash, encrypt, or otherwise convert the browser data to protect user privacy. In these examples, other computer-implemented processes that handle the browser data (e.g., the recognition API 124 and/or the recognition data store 110 of FIG. 1) are configured to address the conversion performed by the browser extension 116. In some examples, the browser extension 116 is configured to identify URLs within the browser data store 114 by searching for strings that satisfy one or more configurable regular expressions.

In some examples, the browser extension 116 is configured to interoperate with the recognition service 106 via the recognition API 124 to receive and process constrained mode requests. Constrained mode requests specify an identifier of a user, a URL string, and one or more constraints to be placed on access to the web resources identified by the URL string when providing the user access thereto. Examples of constraints that can be specified in a constrained mode request include a "no-load" constraint and a "read-only" constraint. In processing constrained mode requests, the browser extension 116 can store, in local storage, constraints specified in the constrained mode requests in association with the URL strings to which they apply, monitor for browser load operations, and enforce the locally stored constraint when a load operation involving the URL string is attempted. By processing constrained mode requests, the browser extension 116 can interoperate with the browser 104 to load a constrained version of the unrecognized web resource 128, prevent the browser 104 from loading the unrecognized web resource 128, or allow the browser 104 to load a normal version of the recognized web resource 126. Further details of example processes that the browser extension 116 is configured to execute are described further below with reference to FIGS. 2A-2C, 3A, 3F, and 3G.

Continuing with examples illustrated by FIG. 1, the recognition service 106 is configured to support web resource recognition within the system 100 by executing a variety of operations. For instance, in some examples, the recognition service 106 is configured to receive and process requests from the communication application extension 112 to determine whether a link addresses a recognized or unrecognized web resource for a user authenticated to the communication application 102. In certain examples, the recognition API 124 included in the recognition service 106 receives and processes these requests by executing a link recognition process, such as the link recognition process 346 described further below with reference to FIG. 3E. In these examples, the recognition API 124 transmits a response to the communication application extension 112 indicating whether the link is safe or unsafe for the authenticated user during its processing of the request. Further, in these examples, to determine whether a link is safe or unsafe, the recognition API 124 retrieves and analyzes browser data associated with the user and stored in the recognition data store 110. In some examples, this browser data is prepopulated by execution of a browser data storage process executed by the recognition API 124, such as a browser data storage process 310 described further below with reference to FIG. 3B.

In some examples, the recognition service 106 is configured to receive and process requests from the browser 104 to serve a web resource to the browser 104. For instance, in certain examples, the redirection interface 118 included in the recognition service 106 can receive and process the request to load a predetermined web page from the browser 104 as a result of the user selecting a replacement link within an electronic communication. In these examples, the redirection interface 118 serves the predetermined web page to the browser 104 during its processing of the request. In certain examples, the predetermine web page encodes a questionnaire that prompts the user to provide additional information regarding the user's preferences in handling the unrecognized web resource. The redirection interface 118 can be further configured through policy to execute additional operations subsequent to receipt of the request from the browser 104. Examples of these subsequent operations can include receiving and processing questionnaire data, initiating a security review, and, depending on the questionnaire data, requesting a constrained view of the unrecognized web resource. Further details of example processes that the redirection interface 118 is configured to execute are described further below with reference to FIGS. 2B, 2C, and 3F.

In some examples, the recognition service 106 is configured to interoperate with the administrative client 130 to render an administrative interface. This administrative interface can interact with an administrator to establish policies that define how other processes implemented within the recognition service 106 operate and/or that enable review and approval of unrecognized web resources for future use. For instance, in certain examples, the policy interface 122 and/or the reviewer interface 120 included in the recognition service 106 can receive and process requests from the administrative client 130 to render the administrative interface. In these examples, the administrative client 130 can be, or can incorporate, a browser. Further, in these examples, the reviewer interface 120 and the policy interface 122 can serve one or more web pages to the administrative client 130 to interoperate with the administrator. Alternatively or additionally, the administrative client 130 can be, or can incorporate, a native application configured to interoperate with the reviewer interface 120 and/or the policy interface 122 via a set of API calls. In some examples, the set of API calls can include an email-based API that enables administrators to add URL strings to the recognition data store 110 via email including the URL string sent from an administrative account to the review interface 120 and/or the policy interface 122. Details regarding example processes that the reviewer interface 120 and/or the policy interface 122 are configured to execute in concert with the administrative client 130 are described further below with reference to FIGS. 3C and 3H.

The architecture of the system 100 illustrated in FIG. 1 is presented by way of example only. In some examples, the communication application extension 112 is omitted. In these examples, the browser extension is configured to scan each inbound navigation request for unrecognized URLs and to redirect any navigation request including an unrecognized URL to the redirection interface 118. Further, in some examples, the recognition service 106 is hosted by the computing device hosting the browser 104. Other architectures will be apparent.

Figure 2A:
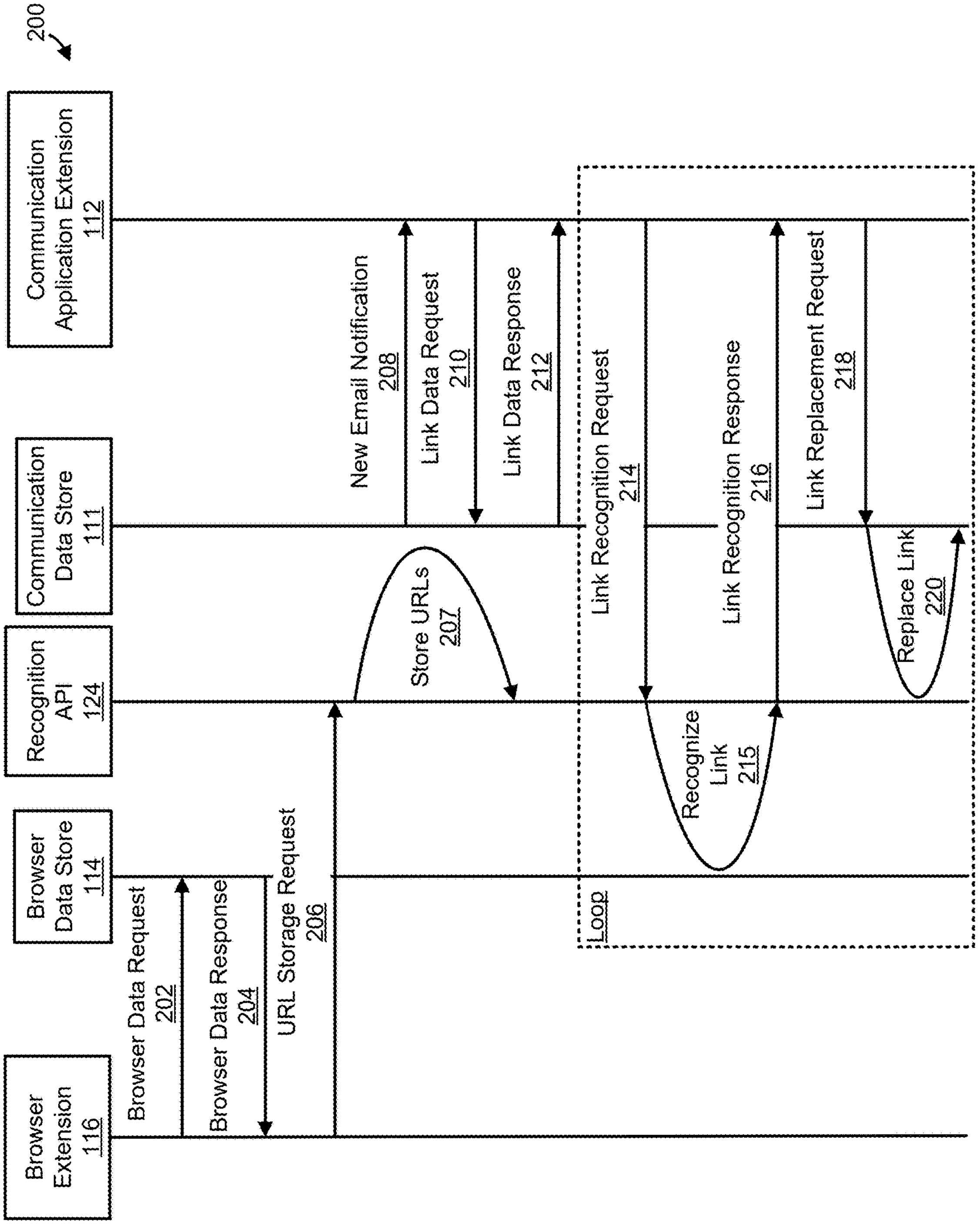
FIG. 2A is a sequence diagram illustrating selected interoperations involved in execution of a link replacement process implemented by the web resource recognition system of FIG. 1 in accordance with an example of the present disclosure.

FIG. 2A is a sequence diagram that illustrates a link replacement process 200 that the system 100 of FIG. 1 is configured to execute in some examples. As shown in FIG. 2A, the process 200 includes a selected set of operations and interoperations that collectively replace unsafe links embedded within an electronic communication with safe embedded links.

The process 200 starts during initial installation and configuration of a system (e.g., the system 100 of FIG. 1) with a browser extension (e.g., the browser extension 116 of FIG. 1) communicating a browser data request 202 to a browser data store (e.g., the browser data store 114). This browser data request 202 can include, for example, a request for URLs of web resources previously accessed by a user from browser history and/or URLs associated with account credentials of the user, regardless of whether the URLs are referenced in the browser history. The browser data store receives the request 202, accesses records that store the requested information, and communicates a browser data response 204 to the browser extension. The browser data response 204 includes data specifying the requested URLs. The browser extension receives the browser data response 204, parses the response 204 to extract the URL data, and communicates the URL data to a recognition API (e.g., the recognition API 124 of FIG. 1) in the form of a URL storage request 206. The recognition API receives the URL storage request 206, parses the request 206, and stores 207 the URL data in a recognition data store (e.g., the recognition data store 110 of FIG. 1) for subsequent processing.

Continuing with the process 200, during production operation of the system, a communication application extension (e.g., the communication application extension 112 of FIG. 1) receives a new email notification 208. In some examples, the notification may originate from a communication data store (e.g., the communication data store 111 of FIG. 1) or from a communication application (e.g., the communication application 102 of FIG. 1) that manages the communication data store. The new email notification can include an identifier of a new email message received by the communication application. In response to receipt of the notification 208, the communication application extension communicates a link data request 210 to the communication data store. The request 210 can include, for example, the identifier of the new email and a request for data specifying links (e.g., URLs) embedded within the new email. The communication data store receives the request 210, accesses records that store the requested information, and communicates a link data response 212 to the communication application extension. The link data response 212 includes data specifying the requested links. The communication application extension receives the link data response 212 and parses the response 212 to extract the link data.

In some examples, for each link in the link data, the communication application extension communicates a link recognition request 214 to the recognition API. The request 214 includes data specifying the link. The recognition API receives the request 214, parses the request 214 to extract the link, and attempts to recognize 215 the link. For instance, in some examples, the recognition API attempts to recognize 215 the link by searching the URL data stored in the recognition data store and associated with the user for a domain string (e.g., "CITRIX.COM") specified within the link. In some implementations, the recognition API recognizes 215 the link where the search returns a domain string from the URL data stored in the recognition data store that is equivalent to the domain string specified within the link. In these implementations, the recognition API does not recognize 215 the link where the search returns no exact match. Next, the recognition API generates and communicates a link recognition response 216 to the communication application extension. The link recognition response 216 specifies whether the recognition API recognized the web resource (e.g., domain) addressed in the link.

In some examples, the communication application extension receives the response 216, parses the response 216, and determines whether the link was recognized. Where the link was recognized, the communication application extension takes no further action. Where the link was not recognized, the second recognition process generates and communicates a link replacement request 218 to the communication data store. The link replacement request 218 specifies a replacement link (e.g., a replacement URL) to a predetermined, safe web resource, such as a web page encoding a questionnaire, as will be discussed further below. The communication data store 111 receives the replacement request 218, parses the request 218, and replaces 220 the link embedded in the new email with the replacement link.

Figure 2B:
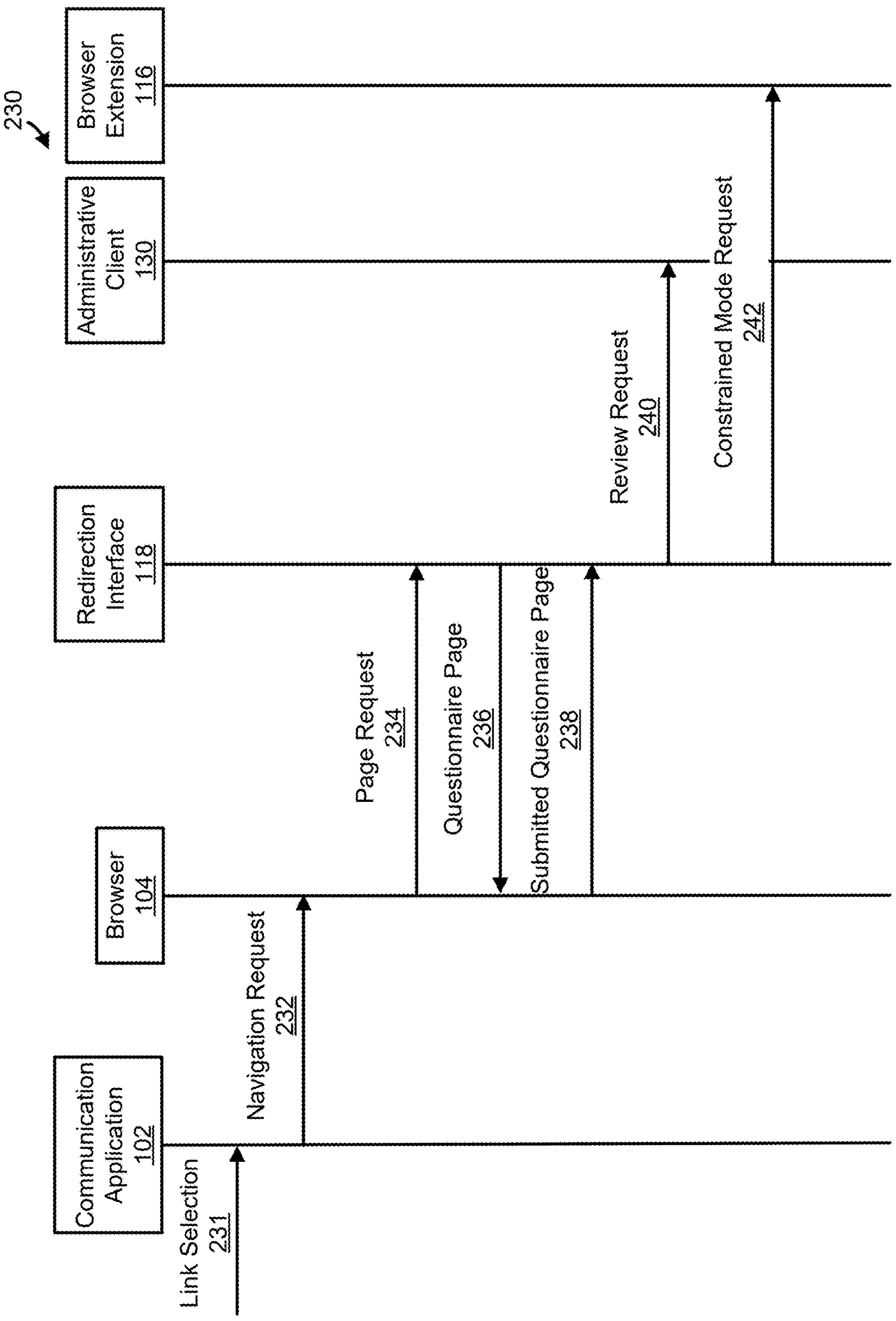
FIGS. 2B and 2C are a sequence diagram illustrating selected interoperations involved in execution of a web resource constraining process implemented by the web resource recognition system of FIG. 1 in accordance with an example of the present disclosure.
Figure 2C:
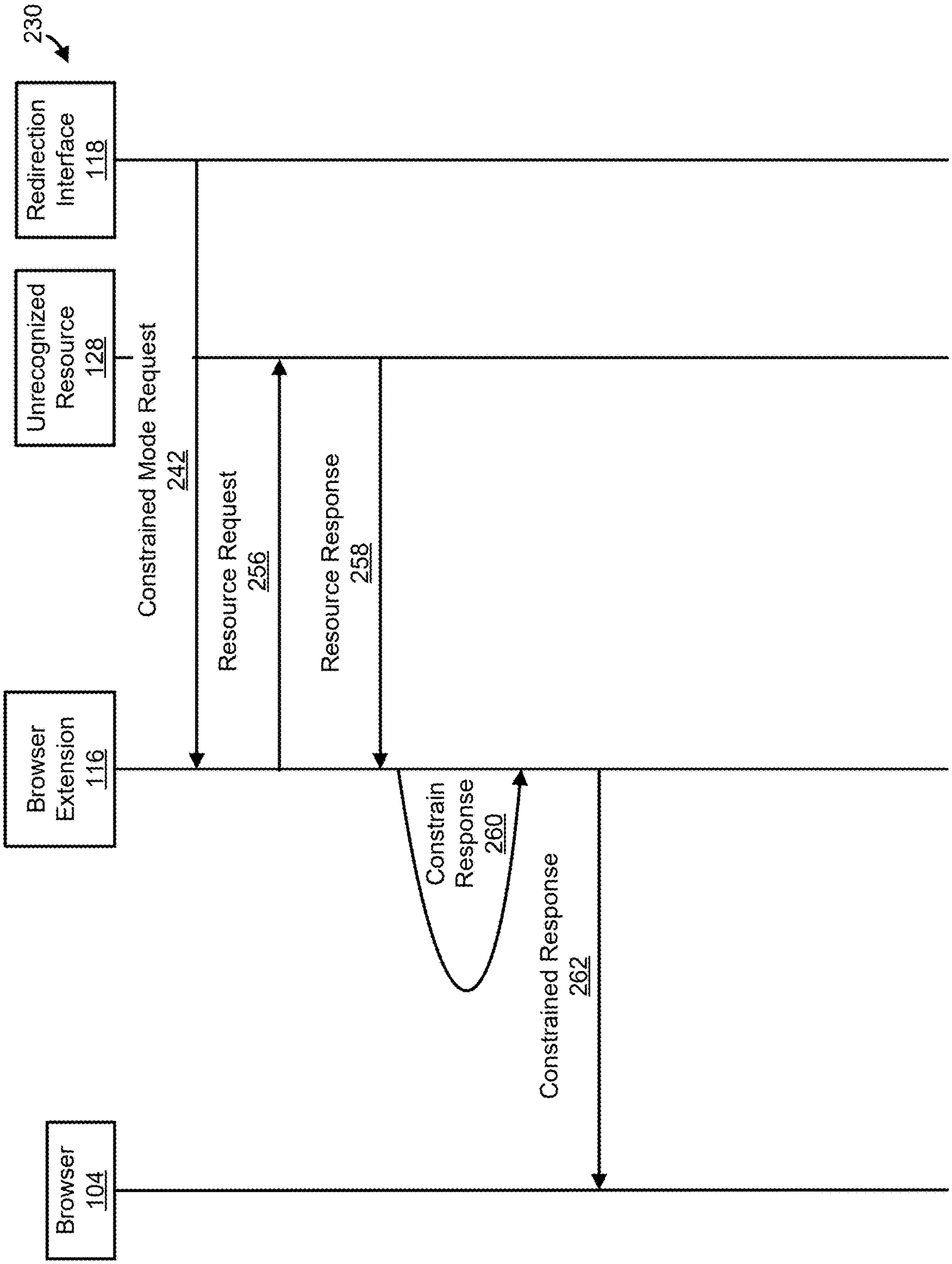

FIGS. 2B-2C are a sequence diagram that illustrates a web resource constraining process 230 that the system 100 of FIG. 1 is configured to execute in some examples. As shown in FIGS. 2B-2C, the process 230 includes a selected set of operations and interoperations that collectively prevent phishing attacks, while allowing users to view constrained versions of unrecognized web resources.

As shown in FIG. 2B, the process 230 starts with a communication application (e.g., the communication application 102 of FIG. 1) receiving a user selection 231 of a link embedded within an electronic communication. In this example, the link is a replacement for a link to an unrecognized web resource (e.g., the unrecognized web resource 128 of FIG. 1). This replacement link can include, for example, a URL to a predetermined web page served by a redirection interface (e.g., the redirection interface 118 of FIG. 1). The URL to the predetermined web page can include, as a parameter, a URL to the unrecognized web resource. In response to receiving user input selecting the replacement link, the communication application communicates (via operating system calls, in some examples) a navigation request 232 including the replacement link to a browser (e.g., the browser 104 of FIG. 1). The browser receives the request 232, parses the request 232 to extract the replacement link, and communicates a page request 234 to the redirection interface, as specified by the replacement link. In certain examples, the page request 234 is an HTTP GET based on the URL to the predetermined web page.

Figure 10:
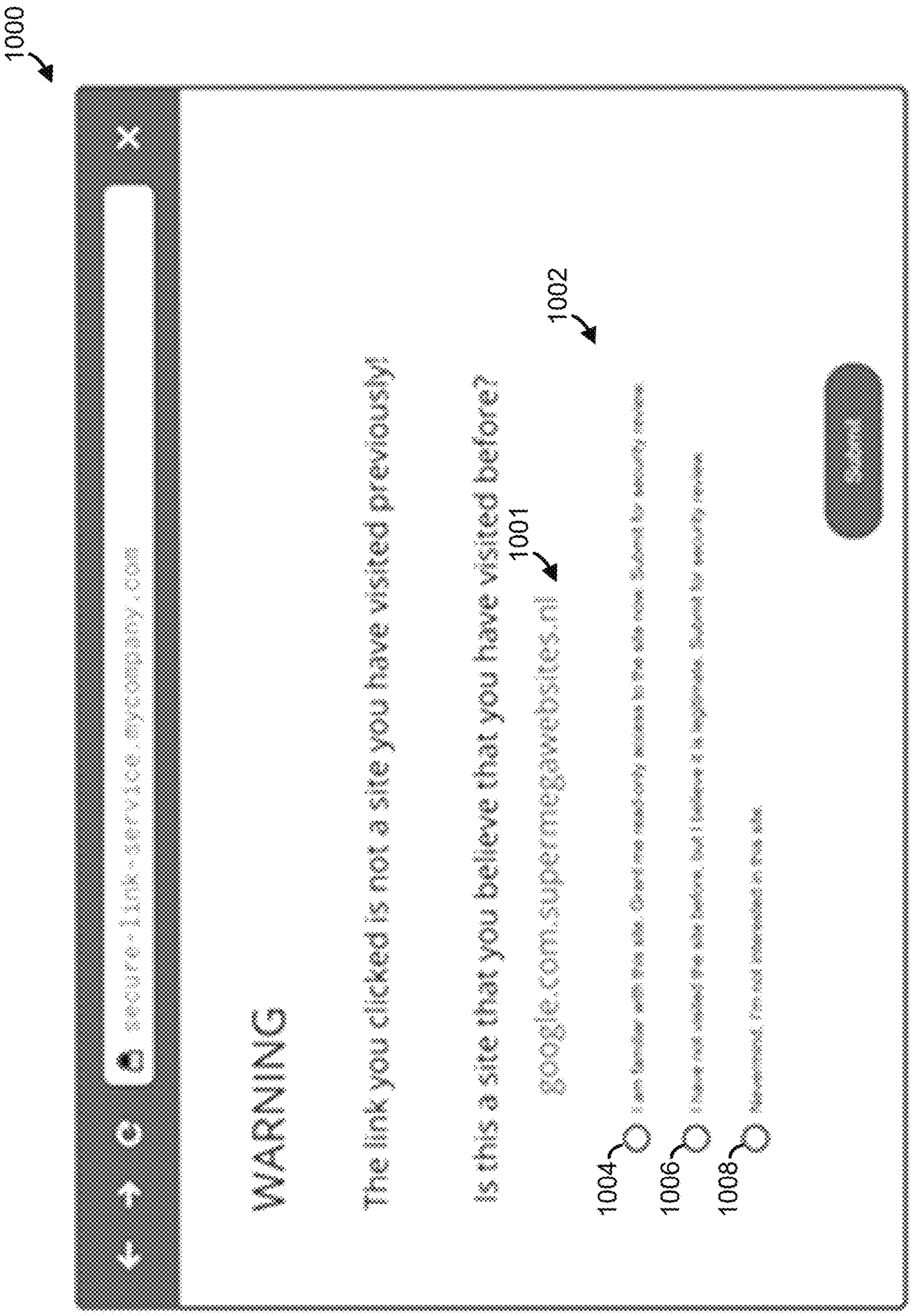
FIG. 10 is a front view of a questionnaire web page served to a browser in accordance with an example of the present disclosure.

Continuing with the process 230, the browser receives the predetermined web page from the redirection interface (e.g., via a response to the HTTP GET) and loads the predetermined web page. In this example, the predetermined web page is a questionnaire page 236 with prompts to elicit additional information from the user. FIG. 10 illustrates one example of a questionnaire page 1000. As illustrated in FIG. 10, the questionnaire page 1000 includes a text control 1001 configured to display a URL string identifying the unrecognized web resource and a radio button control 1002 configured to receive input selecting one of three options buttons 1004, 1006, and 1008. The option button 1004 is selectable by the user to indicate that the user is familiar with the site, wants to access a safely constrained version of the web resource, and requests a security review of the web resource to subsequently enable unconstrained access thereto. The option button 1006 is selectable by the user to indicate that the user is not familiar with the site but requests a security review of the web resource to subsequently enable unconstrained access thereto. The option button 1008 is selectable by the user to indicate that the user is not familiar with the site and wants to discontinue access thereto. In some examples, the questionnaire page 236 includes other and/or additional controls configured to prompt the user for additional information, such as a date of last access of the unrecognized web resource.

Continuing with the process 230, the browser interacts with the user via the questionnaire page 236 and communicates a submitted version of the questionnaire page 238 to the redirection interface. In response to receiving a selection of the option button 1004 in the submitted questionnaire page 238, the redirection interface records and communicates a request 240 for a security review to an administrative client (e.g., the administrative client 130 of FIG. 1). Also in response to receiving a selection of the option button 1004, the redirection interface records and communicates, to a browser extension (e.g., the browser extension 116 of FIG. 1), a constrained mode request 242 to access a constrained version of the unrecognized web resource. The constrained mode request includes the URL that addresses the unrecognized web resource and a "read-only" constraint. In response to receiving a selection of the option button 1006, the redirection interface records and communicates a request for a security review to the administrative client. In response to receiving a selection of the option button 1008, the redirection interface records a request to discontinue interoperation with the unrecognized web resource.

Continuing with the process 230 with reference to FIG. 2C, the browser extension receives and parses the constrained mode request to extract the URL of the unrecognized web resource and the "read-only" constraint. It should be noted that, where the constrained mode request includes a "no-load" constraint, the browser extension saves the URL of the unrecognized web resource in local storage and subsequently prevents the browser from loading the URL. However, due to the presence of the "read-only" constraint, the browser extension communicates (e.g., via an HTTP GET) a resource request 256 to the unrecognized web resource. The unrecognized web resource communicates (e.g., via a response to the HTTP GET) a resource response 258 to the browser extension. The browser extension constrains 260 the unrecognized web resource specified in the response 258. The browser extension can perform this operation using a variety of techniques. For instance, in some examples, the browser extension can disable some or all of the controls and/or instructions included in the unrecognized web resource. Alternatively or additionally, in some examples, the browser extension can configure a proxy for the browser to load the unrecognized web resource. Alternatively or additionally, in some examples, the browser extension can render a graphical representation (e.g., a portable network graphics file) of the unrecognized web resource. The browser extension interoperates with the browser to load the constrained response. The constrained response 262 includes the constrained version of the unrecognized web resource (e.g., the disabled/graphical/proxied version of the unrecognized web resource). Lastly, the browser receives the constrained response 262 and loads the constrained version of the unrecognized web resource for user review.

Figure 3A:
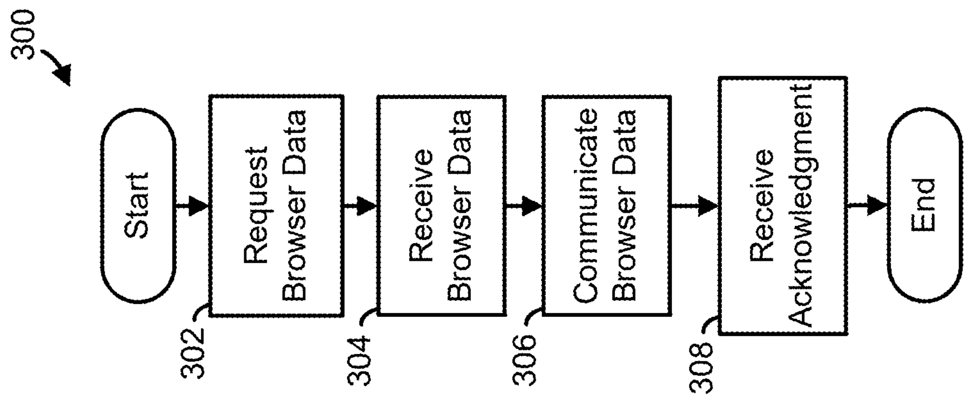
FIG. 3A is a flow diagram of a browser data gathering process in accordance with an example of the present disclosure.

FIG. 3A is a flow diagram illustrating a browser data gathering process 300 useful to extract, from a browser data store (e.g., the browser data store 114 of FIG. 1), URLs of previously accessed web resources and/or URLs associated with user account credentials. The process 300 can be executed, for example, by a browser extension (e.g., the browser extension 116 of FIG. 1).

As shown in FIG. 3A, the process 300 starts with the browser extension requesting 302 browser data from the browser data store. For instance, in some examples, the browser extension communicates (e.g., via one or more browser API calls) one or more requests for URLs of previously accessed web resources and/or URLs associated with user account credentials. The browser extension receives 304 one or more responses that include the requested URLs. The browser extension communicates 306 the received URLs to a recognition API (e.g., the recognition API 124 of FIG. 1) via one or more API calls and, in some examples, receives 308 an acknowledgement of receipt of the URLs from the recognition API. Subsequent to the operation 308, the process 300 ends.

Figure 3B:
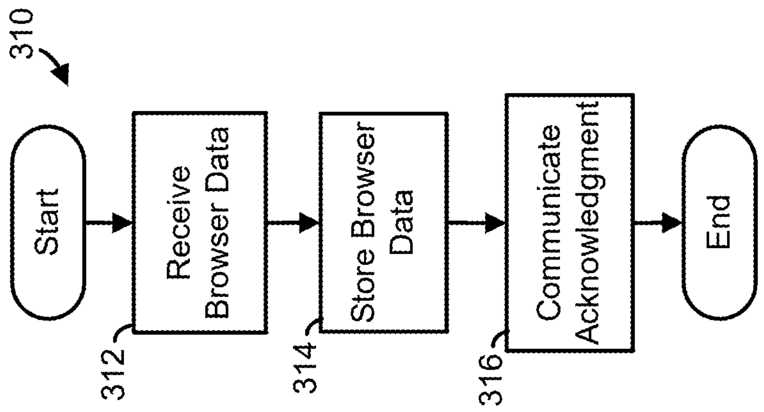
FIG. 3B is a flow diagram of a browser data storage process in accordance with an example of the present disclosure.

FIG. 3B is a flow diagram illustrating a browser data storing process 310 useful to store URLs of previously accessed web resources and/or URLs associated with user account credentials in a recognition data store (e.g., the recognition data store 110 of FIG. 1). The process 310 can be executed, for example, by a recognition API (e.g., the recognition API 124 of FIG. 1).

As shown in FIG. 3B, the process 310 starts with the recognition API receiving 312 browser data from a browser extension (e.g., the browser extension 116 of FIG. 1). For instance, in some examples, the recognition API receives (e.g., via one or more recognition API calls) one or more URLs of previously accessed web resources and/or URLs associated with user account credentials. The recognition API stores 314 the received URLs in the recognition data store and, in some examples, communicates 316 an acknowledgement of receipt of the URLs from to the browser extension. Subsequent to the operation 316, the process 310 ends.

Figure 3C:
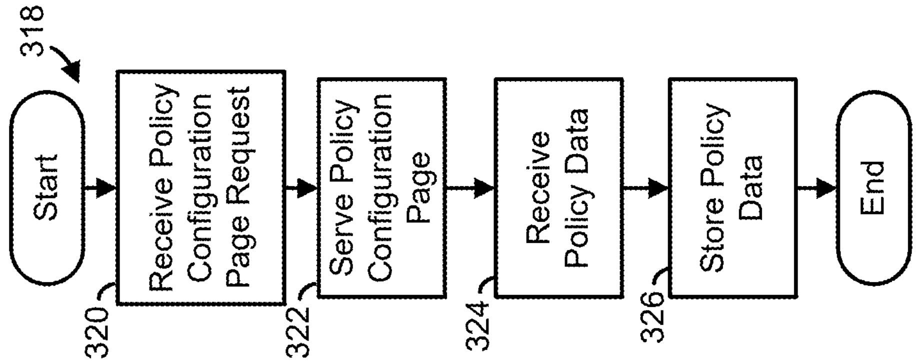
FIG. 3C is a flow diagram of a policy creation process in accordance with an example of the present disclosure.

FIG. 3C is a flow diagram illustrating a policy creation process 318 useful to configure policies within a web resource recognition system (e.g., the system 100 described above with reference to FIG. 1). The process 318 can be executed, for example, by a policy interface (e.g., the policy interface 122 of FIG. 1).

As shown in FIG. 3C, the process 318 starts with the policy interface receiving 320 one or more requests to serve one or more policy configuration web pages from an administrative client (e.g., the administrative client 130 of FIG. 1). The administrative client 130 can be, for example, an independent or embedded browser that has authenticated an administrator. In response to reception of the requests, the policy interface serves 322 the requested policy configuration web pages. The controls included in the policy configuration pages enable the administrator to configured policy data and vary between examples. For instance, in some examples, the policy configuration pages include controls configured to receive input specifying one or more URL strings. In these examples, the URLs strings specify domains to be recorded as recognized and/or unrecognized within a recognition data store (e.g., the recognition data store 110 of FIG. 1) and may be associated with one or more users or user groups. The users or user groups associated with the URL strings may be specified in and accessed via a directory service and/or identity provider specific to an organization serviced by the administrator that employs the users and user groups. Alternatively or additionally, the policy configuration pages can include controls configured to receive input specifying one or more URL strings to be recorded as barred or accessible to all users. In certain examples, the policy configuration pages can include controls configure to receive input specifying whether access to constrained versions of unrecognized web services is available, and, if so, the type of "read-only" constraint (image generation, control disablement, proxy usage, etc.) to be applied to unrecognized web services.

Continuing with the process 318, the policy interface receives 324, from the administrative client, submitted policy data as responses to the served policy configuration pages. The policy interface parses the responses to extract the policy data and stores 326 the policy data within the recognition data store for subsequent processing. Subsequent to the operation 326, the process 318 ends.

Figure 3D:
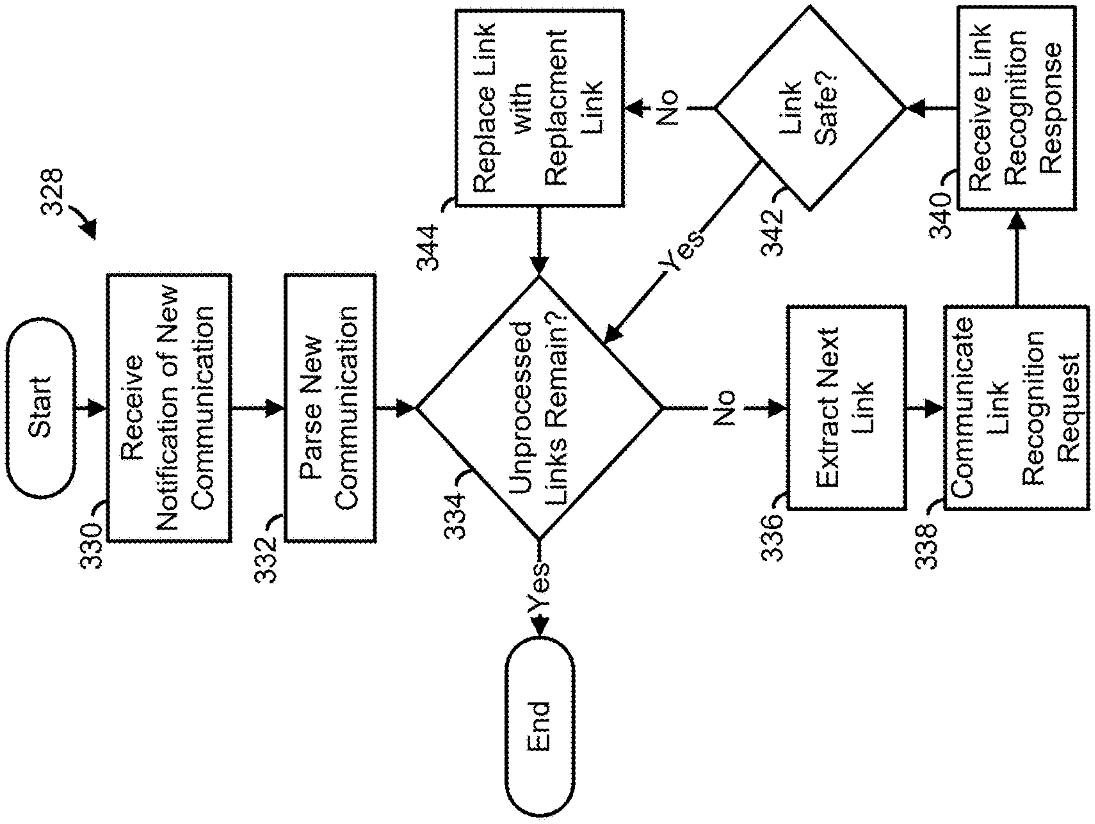
FIG. 3D is a flow diagram of a link replacement process in accordance with another example of the present disclosure.

FIG. 3D is a flow diagram illustrating a link replacement process 328 useful to replace unsafe links embedded within an electronic communication with safe embedded links. The process 328 can be executed, for example, by a communication application extension (e.g., the communication application extension 112 of FIG. 1).

As shown in FIG. 3D, the process 328 starts with the communication application extension receiving 330 a notification of a newly receive electronic communication from a communication application (e.g., the communication application 102 of FIG. 1). For instance, in some examples, the communication application extension monitors a communication data store (e.g., the communication data store 111 of FIG. 1) for new communications. Alternatively or additionally, the communication application extension is registered to handle new communication events propagated by the communication application upon its receipt of a new communication.

Continuing with the process 328, the communication application extension parses 332 the new electronic communication to identify any links embedded therein. Next, the communication application extension determines 334 whether any embedded links remain that have not been processed by operations of the process 328 subsequent to 332. For instance, in some examples, the communication application extension maintains a list of processed and unprocessed embedded links in memory. Where the communication application extension determines that no unprocessed links remain, the process 328 ends. Where the communication application determines that at least one unprocessed link remains, the communication application extension extracts 336 the next link.

Continuing with the process 328, the communication application extension communicates 338 a link recognition request specifying the link extracted in the operation 338 to a recognition API (e.g., the recognition API 124 of FIG. 1). For instance, in some examples, the communication application extension communicates one or more API calls to the recognition API to communicate the link recognition request. Subsequently, the communication application extension receives 340 a link recognition response from the recognition API. The link recognition response specifies whether the link is safe (e.g., the link addresses a recognized web resource) or unsafe (the link addresses an unrecognized web resource).

Continuing with the process 328, the communication application extension determines 342 whether the link is safe by parsing and inspecting the link recognition response. Where the communication application extension determines that the link is safe, the communication application extension returns to the operation 334 to scan for additional, unprocessed links. Where the communication application extension determines that the link is unsafe, the communication application extension replaces the link with a replacement link. For instance, in some examples, the communication application extension replaces the link embedded in the new communication with a replacement link that specifies a URL addressing a safe, predetermine web page (e.g., the questionnaire web page 1000 of FIG. 10). Subsequent to replacing 344 the link, the communication application extension returns to the operation 334 to scan for additional, unprocessed links.

Figure 3E:
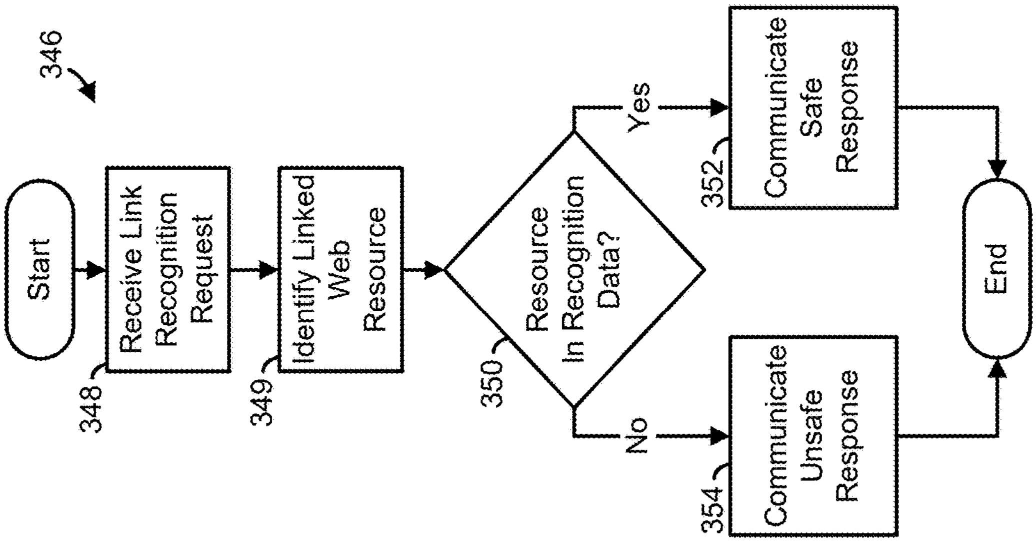
FIG. 3E is a flow diagram of a link recognition process in accordance with an example of the present disclosure.

FIG. 3E is a flow diagram illustrating a link recognition process 346 useful to identify safe and unsafe links. The process 346 can be executed, for example, by a recognition API (e.g., the recognition API 124 of FIG. 1).

As shown in FIG. 3E, the process 346 starts with the recognition API receiving 348 a link recognition request from a communication application extension (e.g., the communication application extension 112 of FIG. 1). For instance, in some examples, the recognition API implements and exposes an API that receives and responds to requests to determine whether a web resource addressed by a link is recognized as safe. In these examples, the recognition API receives a link recognition request via receipt of one or more calls defined by the API.

Continuing with the process 346, the recognition API parses the link recognition request to extract the link specified therein and unfurls the link to identify 349 one or more web resources accessible via the link. For instance, in some examples, the link is a URL (e.g., "https://www.no-redirects-.com/") that directly addresses a single web resource. In these examples, to unfurl the link the recognition API follows the initial URL, loads the web resource addressed thereby, determines that no additional redirects are requested within the web resource, and stores a URL string (e.g., a domain) that identifies the web resource for subsequent processing. In other examples, the link is a URL (e.g., "http://www.redirects-included.com/") that includes one or more intermediate web resources prior to a final web resource at a final URL (e.g., "https://www.no-redirects-.com/"). In these examples, to unfurl the link the recognition API follows the initial URL, loads the web resource addressed thereby, determines that additional redirects are requested within the web resource, stores a URL string (e.g., a domain) that identifies the web resource for subsequent processing, and iterates through any number of intermediate URLs and a final URL using the same operations. As a result, in these examples, the recognition API identifies a plurality of URL strings stored for subsequent processing.

Continuing with the process 346, the recognition API determines 350 whether each web resource accessible via the link is recognized or unrecognized. For instance, in some examples, the recognition API searches URL data stored in a recognition data store (e.g., the recognition data store 110 of FIG. 1) for a domain string (e.g., "CITRIX.COM") associated with the user that matches one of the URL strings stored by the operation 349. In some implementations, the recognition API determines that the link is recognized where the search returns a match for each URL string stored by the operation 349. In these implementations, the recognition API does not recognize the link where the search returns no exact match for one or more of the URL strings stored by the operation 349. Where the recognition API recognizes the link, the recognition API generates and communicates 352 a link recognition response to the communication application extension that indicates the link is safe, and the process 346 ends. Where the recognition API does not recognize the link, the recognition API generates and communicates 354 a link recognition response to the communication application extension that indicates the link is unsafe, and the process 346 ends.

Figure 3F:
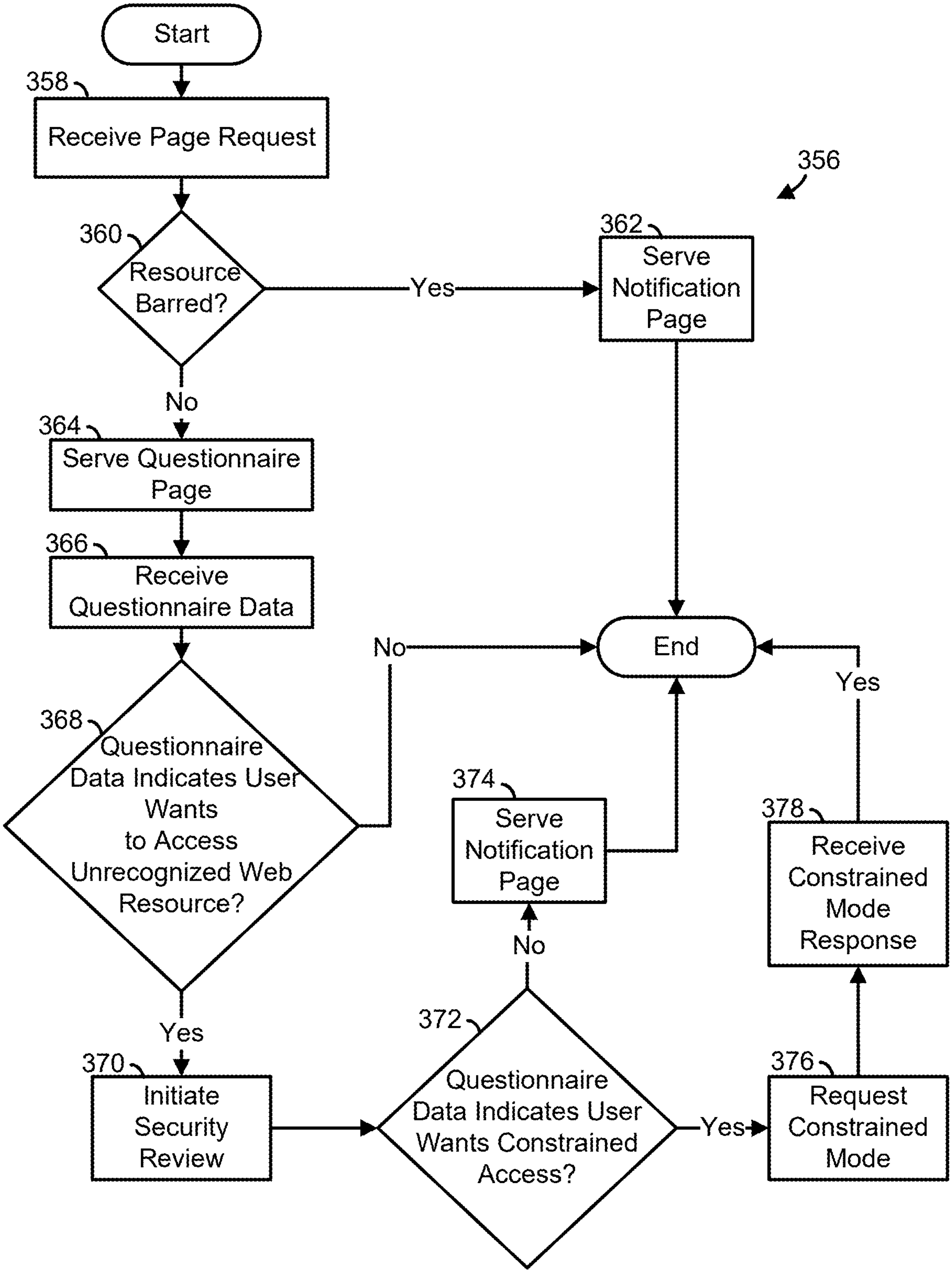
FIG. 3F is a flow diagram of a user prompting process in accordance with an example of the present disclosure.

FIG. 3F is a flow diagram illustrating a user consultation process 356 useful to identify a user's preferences in handling unrecognized links. The process 356 can be collectively executed, for example, by a redirection interface (e.g., the redirection interface 118 of FIG. 1) and a recognition API (e.g., the recognition API 124 of FIG. 1).

As shown in FIG. 3F, the process 356 starts with the redirection interface receiving 358 a request to serve a predetermined web page from a browser (e.g., the browser 104 of FIG. 1). In some examples, this request results from a user selecting a replacement link for a link to an unrecognized web resource embedded within an electronic communication. In some examples, the redirection interface next determines 360 whether the unrecognized web resource is barred by policy. For instance, in some examples, the redirection interface searches barred URL data associated with the user stored in a recognition data store (e.g., the recognition data store 110 of FIG. 1) for a domain string (e.g., "CITRIX.COM") that matches a URL string of the unrecognized web resource. In these examples, the redirection interface determines that the link is barred where the search returns an exact match for the URL string of the unrecognized web resource. Also, in these examples, the redirection interface determines that the link is not barred where the search returns no exact match for the URL string of the unrecognized web resource. Where the redirection interface determines that the unrecognized web resource is barred by policy, the redirection interface serves 362 a notification page to the browser in response to the request for the predetermined web page, and the process 356 ends. The notification page includes controls to notify the user that the system will discontinue attempting to access the unrecognized web resource and/or instructions to close the browser. Where the redirection interface determines that the unrecognized web resource is not barred by policy, the redirection interface proceeds to operation 364.

Continuing with the process 356, the redirection interface serves 364 a web page encoding a questionnaire to the browser. One example of such a questionnaire 1000 is illustrated in FIG. 10. Next, the redirection interface receives 366 questionnaire data in a submitted response to the questionnaire. This questionnaire data can include indications of whether the user wants to discontinue attempting to access the unrecognized web resource, wants to have the unrecognized web resource reviewed, and/or wants to access a constrained version of the unrecognized web resource.

Continuing with the process 356, the redirection interface determines 368 whether the questionnaire data indicates that the user wants to discontinue attempting to access the unrecognized web resource. For example, the redirection interface can determine whether the option 1008 illustrated in FIG. 10 is selected. Where the redirection interface determines that the user wants to discontinue attempting to access the unrecognized web resource, the process 356 ends. Where the redirection interface determines that the user wants to continue attempting to access the unrecognized web resource, the redirection interface initiates 370 a security review of the unrecognized web resource by communicating a review request to an administrative client (e.g., the administrative client 130 of FIG. 1).

Continuing with the process 356, the redirection interface determines 372 whether the questionnaire data indicates that the user wants to access a constrained version of the unrecognized web resource. For example, the redirection interface can determine whether the option 1006 or the option 1004 illustrated in FIG. 10 is selected. Where the redirection interface determines that the user does not want to access a constrained version of the web resource, the redirection interface serves 374 a notification page to the browser, and the process 356 ends. The notification page includes controls to notify the user that a security review has been initiated and/or instructions to close the browser. Where the redirection interface determines that the user wants to access a constrained version of the unrecognized web resource, the redirection interface communicates 376, via the recognition API, a constrained mode request to a browser extension (e.g., the browser extension 116 of FIG. 1). Next, the recognition API receives 378 an acknowledgement, and the process 356 ends.

Figure 3G:
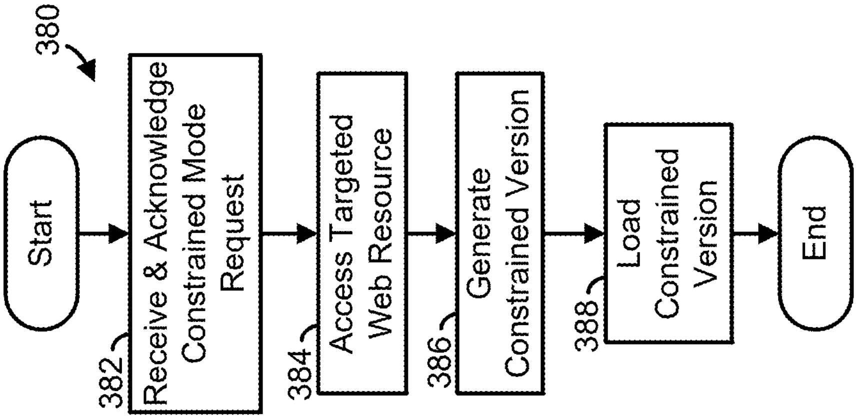
FIG. 3G is a flow diagram of a web resource constraining process in accordance with an example of the present disclosure.

FIG. 3G is a flow diagram illustrating a web resource constraining process 380 useful to constrain unrecognized web resources so that user may safely review constrained versions of the web resources. The process 380 can be executed, for example, by a browser extension (e.g., the browser extension 116 of FIG. 1).

As shown in FIG. 3G, the process 380 starts with the browser extension receiving and acknowledging 382 a constrained mode request from a recognition API (e.g., the recognition API 124 of FIG. 1). Next, the browser extension parses the constrained mode request to extract an identifier of a constraint to be applied and a URL that addresses the web resource targeted for the constraint.

Continuing with the process 380, the browser extension accesses 384 (e.g., via an HTTP message) the target web resource and generates 386 a constrained version of the target web resource. The browser extension can perform the operation 386 using a variety of techniques. For instance, in some examples, the browser extension can disable some or all of the controls and/or instructions included in the target web resource. Alternatively or additionally, in some examples, the browser extension can configure a proxy for the browser to load the target web resource. Alternatively or additionally, in some examples, the browser extension can render a graphical representation (e.g., a portable network graphics file) of the target web resource.

Continuing with the process 380, the browser extension can interoperate with its host browser (e.g., the browser 104 of FIG. 1) to load the constrained version of the target web resource for user review. Subsequent to the operation 388, the process 380 ends.

Figure 3H:
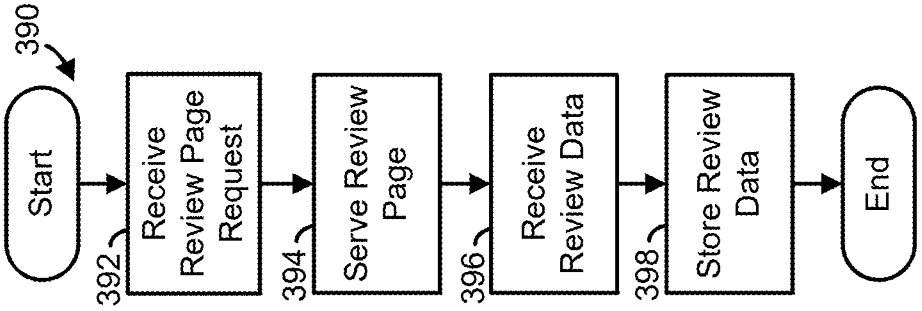
FIG. 3H is a flow diagram of a resource review process in accordance with an example of the present disclosure.

FIG. 3H is a flow diagram illustrating a web resource review process 390 useful to store review data within a recognition data store (e.g., the recognition data store 110 of FIG. 1). The process 390 can be executed, for example, by a reviewer interface (e.g., the reviewer interface 120 of FIG. 1).

As shown in FIG. 3H, the process 390 starts with the reviewer interface receiving 392 one or more requests to serve one or more resource review web pages from an administrative client (e.g., the administrative client 130 of FIG. 1). The administrative client 130 can be, for example, an independent or embedded browser that has authenticated an administrator. In response to reception of the requests, the reviewer interface serves 394 the requested resource review web pages. The controls included in resource review pages enable the administrator to configured URL data and vary between examples. For instance, in some examples, the resource review pages include controls configured to generate a constrained version of the web resource under review and to load the constrained version for administrator review. In certain examples, the resource review pages include controls configured to load an unconstrained version of the web resource under review within a secure environment (e.g., a secure browser service) for administrator review. Additionally, in some examples, the resource review pages include controls configured to receive input specifying one or more URL strings of the web resource under review. In these examples, the URLs strings specify domains to be recorded as recognized and/or unrecognized within the recognition data store. The user groups associated with the URL strings may be specified in and accessed via a directory service and/or identity provider specific to an organization serviced by the administrator that employs the users within the user groups. Alternatively or additionally, the resource review pages can include controls configured to receive input specifying one or more URL strings of the web resource under review to be recorded as barred or accessible to all users.

Continuing with the process 390, the reviewer interface receives 396, from the administrative client, submitted review data as responses to the served resource review pages. The reviewer interface parses the responses to extract the review data and stores 398 the review data within the recognition data store for subsequent processing. Subsequent to the operation 398, the process 390 ends.

Computing Devices for Web Resource Recognition Systems

Figure 4:
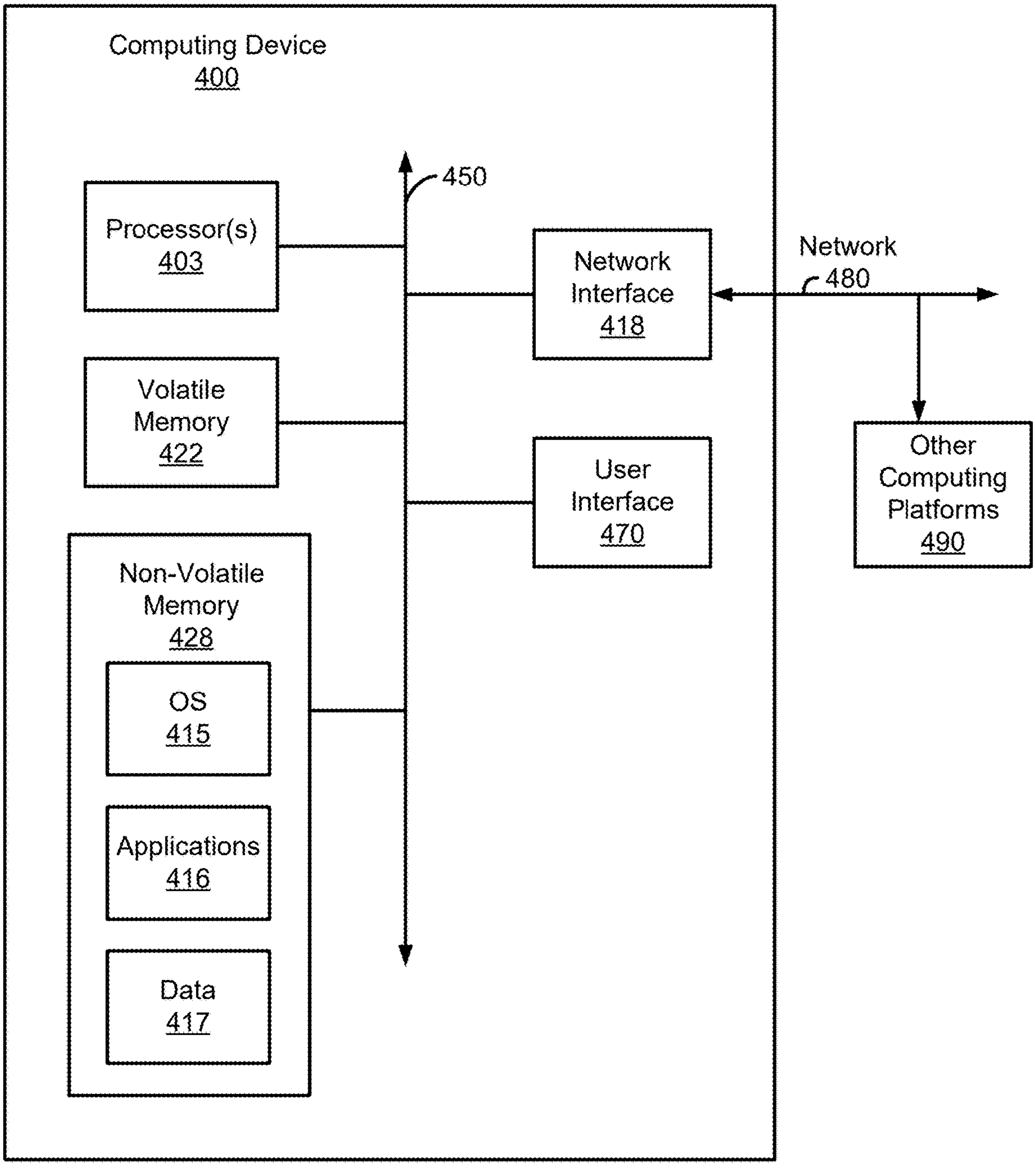
FIG. 4 is a block diagram of a network environment of computing devices in which various aspects of the present disclosure can be implemented.

FIG. 4 is a block diagram of a computing device 400 configured to implement various web resource recognition systems and processes in accordance with examples disclosed herein.

The computing device 400 includes one or more processors 403, volatile memory 422 (e.g., random access memory (RAM)), non-volatile memory 428, a user interface (UI) 470, one or more network or communication interfaces 418, and a communications bus 450. The computing device 400 may also be referred to as a client device, computing device, endpoint device, computer, or a computer system.

The non-volatile (non-transitory) memory 428 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 470 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, one or more accelerometers, one or more visors, etc.).

The non-volatile memory 428 stores an operating system 415, one or more applications or programs 416, and data 417. The operating system 415 and the application 416 include sequences of instructions that are encoded for execution by the processors 403. Execution of these instructions results in manipulated data. Prior to their execution, the instructions can be copied to the volatile memory 422. In some examples, the volatile memory 422 can include one or more types of RAM and/or a cache memory that can offer a faster response time than a main memory. Data can be entered through the user interface 470 or received from the other I/O devices, such as the network interface 418. The various elements of the device 400 described above can communicate with one another via the communications bus 450.

The illustrated computing device 400 is shown merely as an example client device or server and can be implemented within any computing or processing environment with any type of physical or virtual machine or set of physical and virtual machines that can have suitable hardware and/or software capable of operating as described herein.

The processors 403 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processors 403 can be analog, digital or mixed. In some examples, the processors 403 can be one or more local physical processors or one or more remotely located physical processors. A processor including multiple processor cores and/or multiple processors can provide functionality for parallel, simultaneous execution of instructions or for parallel, simultaneous execution of one instruction on more than one piece of data.

The network interfaces 418 can include one or more interfaces to enable the computing device 400 to access a computer network 480 such as a Local Area Network (LAN), a Wide Area Network (WAN), a Personal Area Network (PAN), or the Internet through a variety of wired and/or wireless connections, including cellular connections and Bluetooth connections. In some examples, the network 480 may allow for communication with other computing devices 490, to enable distributed computing. The network 480 can include, for example, one or more private and/or public networks over which computing devices can exchange data.

In described examples, the computing device 400 can execute an application on behalf of a user of a client device. For example, the computing device 400 can execute one or more virtual machines managed by a hypervisor. Individual virtual machines can provide an execution session within which applications execute on behalf of a user or a client device, such as a hosted desktop session. The computing device 400 can also execute a terminal services session to provide a hosted desktop environment. The computing device 400 can provide access to a remote computing environment including one or more applications, one or more desktop applications, and one or more desktop sessions in which one or more applications can execute.

Figure 5:
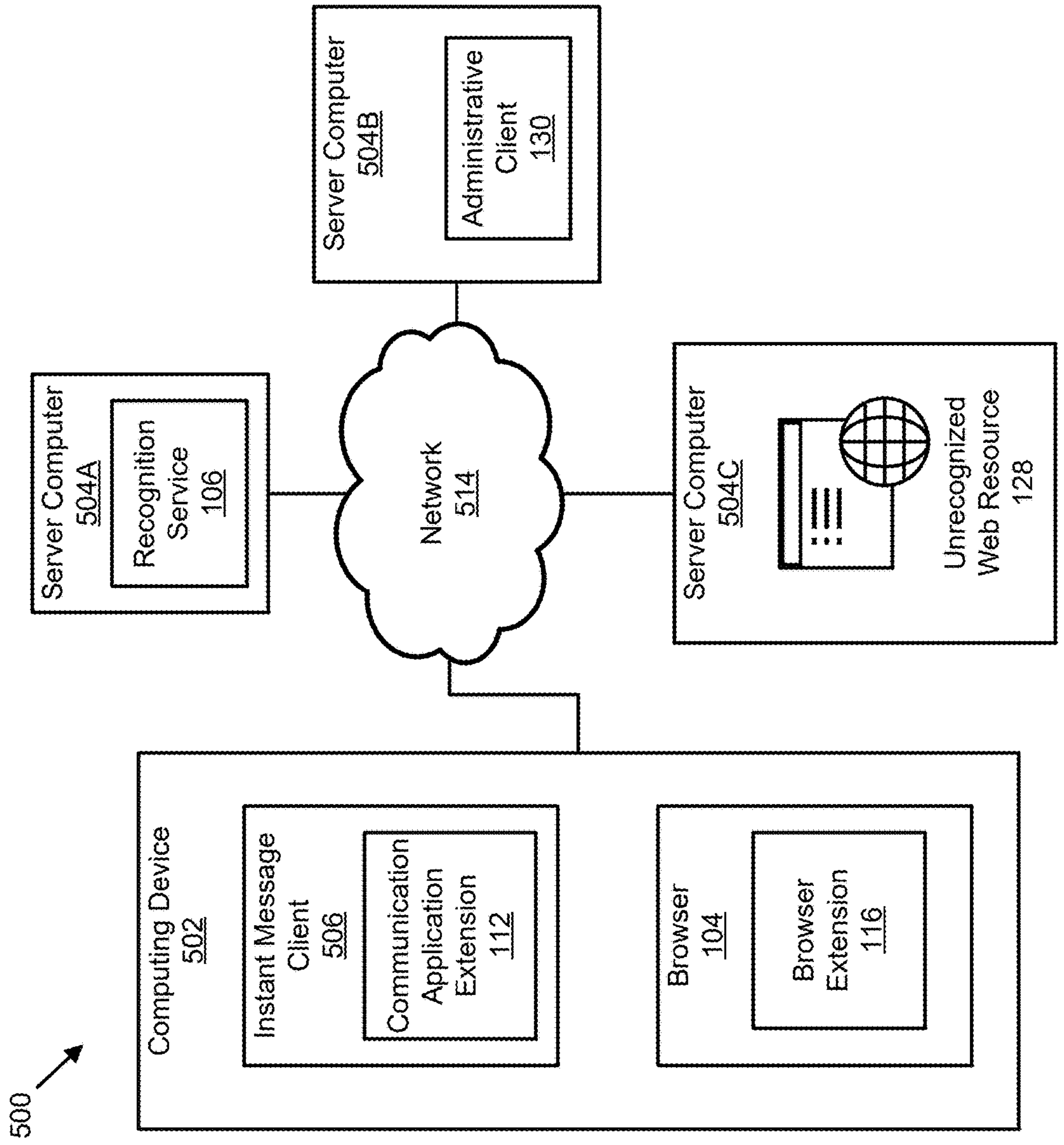
FIG. 5 is a block diagram of the web resource recognition system of FIG. 1 as implemented by a configuration of computing devices in accordance with an example of the present disclosure.

FIG. 5 illustrates a web resource recognition system (e.g., the web resource recognition system 100 of FIG. 1) configured for operation within a distributed computing system 500 comprising computing devices. As shown in FIG. 5, the distributed computing system 500 includes server computers 504A-504C that are configured to interoperate with one another and an endpoint computing device 502 via a network 514.

The server computer 504A is configured to host the recognition service 106 of FIG. 1. The server computer 504B is configured to host the administrative client 130 of FIG. 1. The server computer 504C is configured to host the unrecognized web resource 128 of FIG. 1. The endpoint device 502 is configured to host an instant message client 506 and the browser 104 of FIG. 1. The instant message client 506 is one example of the communication application 102 of FIG. 1 and is configured to host the communication application extension 112 of FIG. 1. Examples of the endpoint computing device 502 and the server computers 504A-504C include the computing device 400 of FIG. 4.

Figure 6:
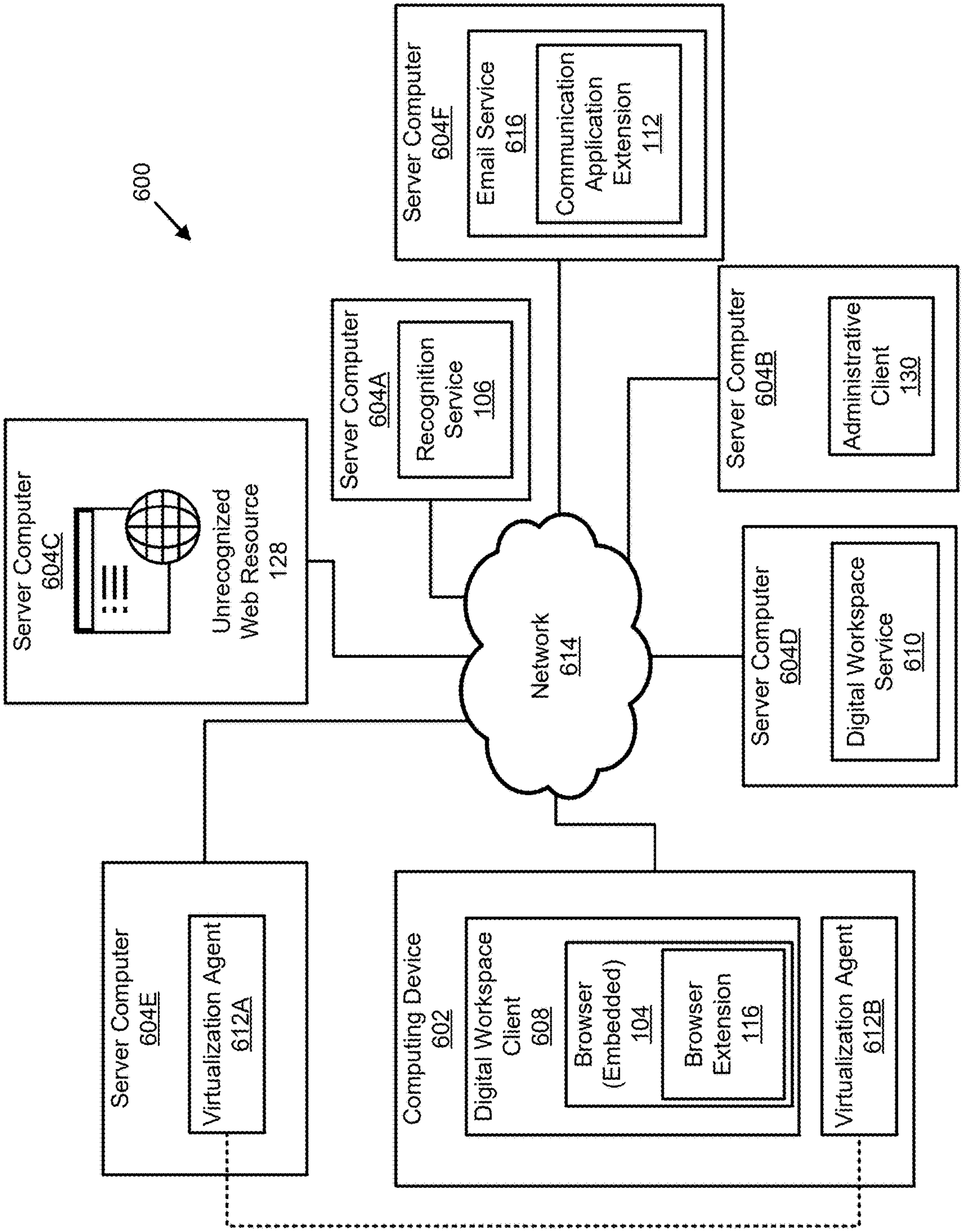
FIG. 6 is a block diagram of the web resource recognition system of FIG. 1 as implemented by a configuration of computing devices in accordance with another example of the present disclosure.

FIG. 6 illustrates a web resource recognition system (e.g., the web resource recognition system 100 of FIG. 1) configured for operation within a distributed computing system 600 comprising computing devices. As shown in FIG. 6, the distributed computing system 600 includes server computers 604A-604F that are configured to interoperate with one another and an endpoint computing device 602 via a network 614.

The server computer 604A is configured to host the recognition service 106 of FIG. 1. The server computer 604B is configured to host the administrative client 130 of FIG. 1. The server computer 604C is configured to host the unrecognized web resource 128 of FIG. 1. The server computer 604D is configured to host a digital workspace service 610, such as the Citrix Workspace™ service. The server computer 604E is configured to host a virtualization agent 612A. The server computer 604F is configured to host an email service 616. The email service 616 is one example of the communication application 102 of FIG. 1 and is configured to host the communication application extension 112 of FIG. 1. The endpoint device 602 is configured to host a digital workspace client 608 and a virtualization agent 612B. As shown in FIG. 6, the digital workspace client 608 incorporates the browser 104 of FIG. 1. The browser 104, in turn, incorporates the browser extension 116 of FIG. 1. Examples of the endpoint computing device 602 and the server computers 604A-604E include the computing device 400 of FIG. 4.

As shown in FIG. 6, the virtualization agent 612A and the virtualization agent 612B are configured to interoperate within a virtualization infrastructure. This virtualization infrastructure enables an application executing within a first physical computing environment (e.g., the server computer 604E) to be accessed by a user of a second physical computing environment (e.g., the endpoint computing device 602) as if the application was executing within the second physical computing environment. Within the virtualization infrastructure, the virtualization agent 612A is configured to make a computing environment in which it operates available to execute virtual computing sessions. The virtualization agent 612A can be further configured to manage connections between these virtual computing sessions and other processes within the virtualization infrastructure, such as the virtualization agent 612B. In a complementary fashion, the virtualization agent 612B is configured to instigate and connect to the virtual computing sessions managed by the virtualization agent 612A. The virtualization agent 612B is also configured to interoperate with other processes executing within its computing environment (e.g., the digital workspace client 608) to provide those processes with access to the virtual computing sessions and the virtual resources therein. Within the context of a Citrix HDX™ virtualization infrastructure, the virtualization agent 612A can be implemented as, for example, a virtual delivery agent installed on a physical or virtual server or desktop and the virtualization agent 612B can be implemented as a local service in support of the digital workspace client 608. In this context, the digital workspace client 608 can include, for example, a Citrix Workspace™ client or Citrix Receiver™ for hypertext markup language (HTML) 5 browsers. As explained above, in some examples, the digital workspace client 608 includes the embedded browser 104. The embedded browser can be implemented, for example, using the Chromium Embedded Framework.

Continuing with the example illustrated in FIG. 6, the digital workspace client 608 and the digital workspace service 610 collectively implement a digital workspace application. This digital workspace application is configured to deliver and manage a user's applications, data, and desktops in a consistent and secure manner, regardless of the user's device or location. The digital workspace application enhances the user experience by streamlining and automating those tasks that a user performs frequently, such as approving expense reports, confirming calendar appointments, submitting helpdesk tickets, and reviewing vacation requests. The workspace application allows users to access functionality provided by multiple enterprise applications-including SaaS applications, web applications, desktop applications, and proprietary applications-through a single interface rendered by the digital workspace client 608.

In certain examples, the digital workspace service 610 is configured to control the applications, data, and desktops that users may access via the digital workspace client 608 and to help establish connections between the digital workspace client 608 and the available applications, data, and desktops. As such, the digital workspace service 610 exposes and implements an administrative interface configured to interact with administrators. The digital workspace service 610 is configured to receive, via this administrative interface, configuration information that specifies the applications, data, and desktops that users may access via the digital workspace client 608.

Figure 7:
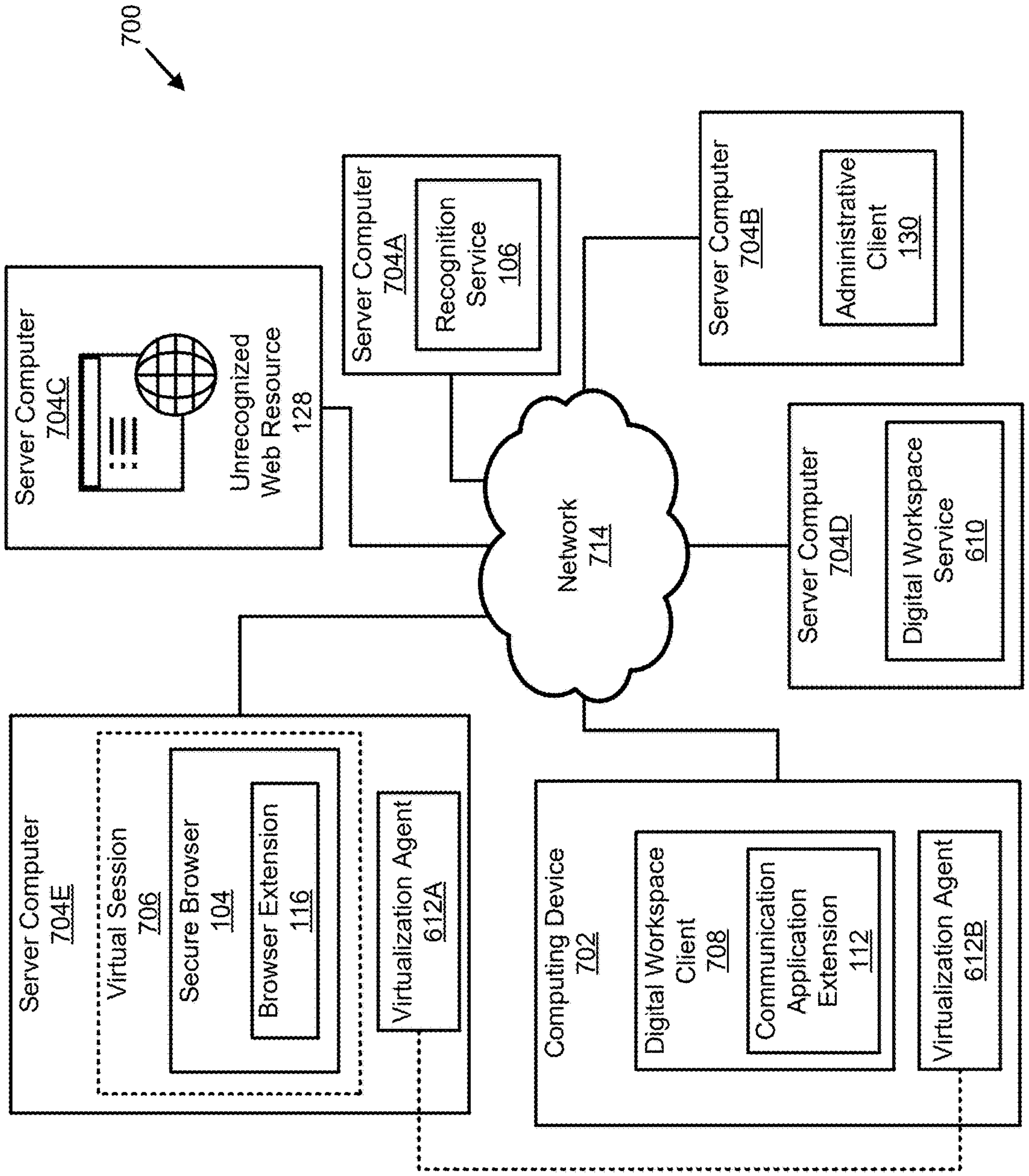
FIG. 7 is a block diagram of the web resource recognition system of FIG. 1 as implemented by a configuration of computing devices in accordance with another example of the present disclosure.

FIG. 7 illustrates a web resource recognition system (e.g., the web resource recognition system 100 of FIG. 1) configured for operation within a distributed computing system 700 comprising computing devices. As shown in FIG. 7, the distributed computing system 700 includes server computers 704A-704E that are configured to interoperate with one another and an endpoint computing device 702 via a network 714.

The server computer 704A is configured to host the recognition service 106 of FIG. 1. The server computer 704B is configured to host the administrative client 130 of FIG. 1. The server computer 704C is configured to host the unrecognized web resource 128 of FIG. 1. The server computer 704D is configured to host the digital workspace service 610 of FIG. 6. The server computer 704E is configured to host the virtualization agent 612A of FIG. 6 and the browser 104 of FIG. 1 within a virtual computing session 706. The endpoint device 702 is configured to host a digital workspace client 708 and the virtualization agent 612B of FIG. 6. The digital workspace client 708 is one example of the communication application 102 of FIG. 1 and is configured to host the communication application extension 112 of FIG. 1. Examples of the endpoint computing device 702 and the server computers 704A-704E include the computing device 400 of FIG. 4.

As shown in FIG. 7, the digital workspace client 708 implements the functionality of the digital workspace client 608, but the browser embedded within the digital workspace client 708 omits the browser extension 116. Rather, in examples illustrated by FIG. 7, the browser extension 116 is implemented within the browser 104. In this example, the browser 104 is a secure (virtual) browser hosted within the virtual computing session 706 and accessible by the digital workspace client 708 via the virtualization infrastructure implemented by the virtualization agents 612A and 612B and the digital workspace service 610.

Figure 8:
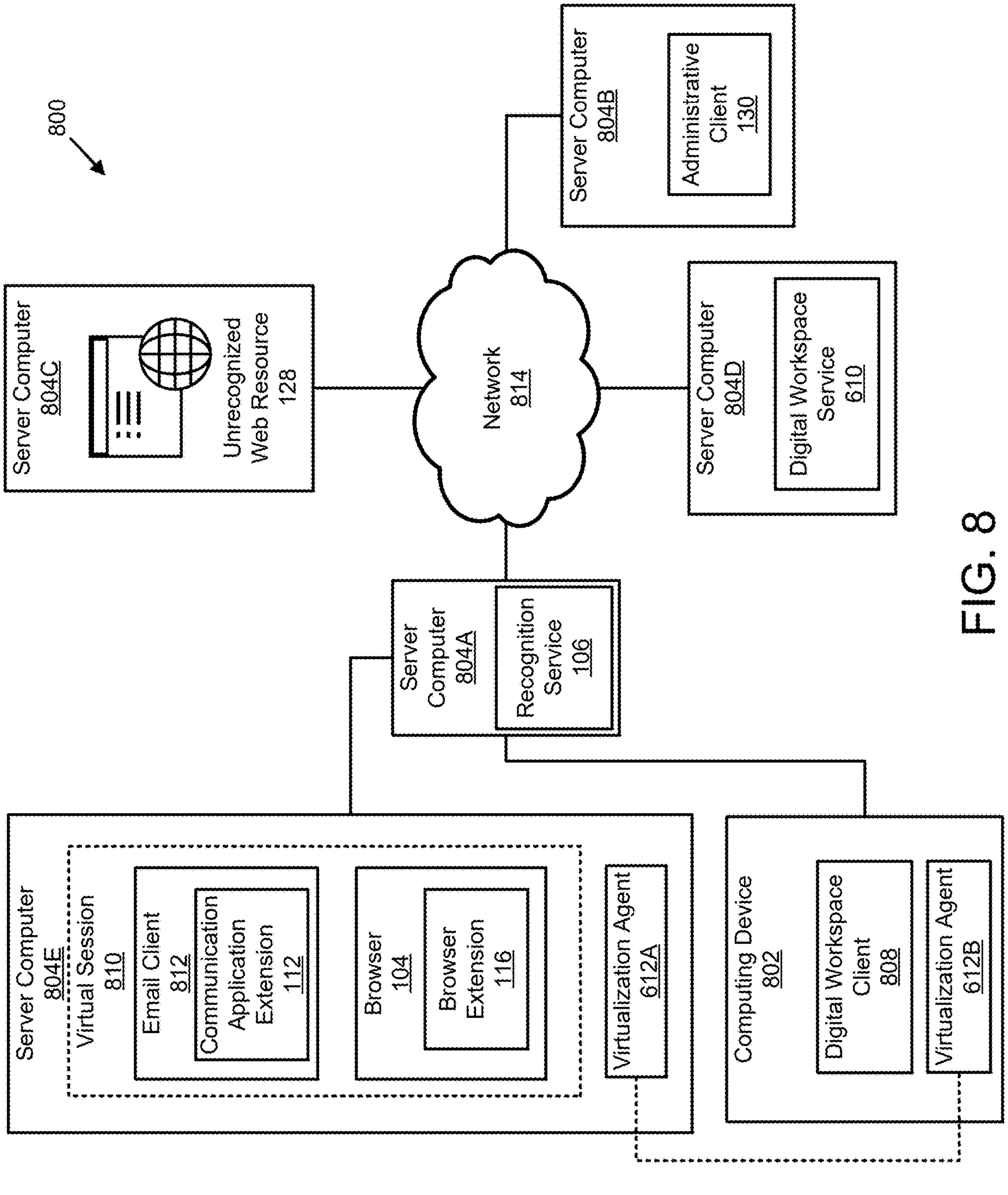
FIG. 8 is a block diagram of the web resource recognition system of FIG. 1 as implemented by a configuration of computing devices in accordance with another example of the present disclosure.

FIG. 8 illustrates a web resource recognition system (e.g., the web resource recognition system 100 of FIG. 1) configured for operation within a distributed computing system 800 comprising computing devices. As shown in FIG. 8, the distributed computing system 800 includes server computers 804A-804D that are configured to interoperate with one another via a network 814. The distributed computing system 800 further includes an endpoint computing device 802 and the server computer 804E that are configured to interoperate with one another via a private network that includes the server computer 804A, which is operating as a gateway between the private network and the network 814.

The server computer 804A is configured to host the recognition service 106 of FIG. 1. The server computer 804B is configured to host the administrative client 130 of FIG. 1. The server computer 804C is configured to host the unrecognized web resource 128 of FIG. 1. The server computer 804D is configured to host the digital workspace service 610 of FIG. 6. The server computer 804E is configured to host the virtualization agent 612A of FIG. 6. The server computer 804E is further configured to host an email client 812 and the browser 104 of FIG. 1 in a virtual computing session 810. The email client 812 is one example of the communication application 102 of FIG. 1 and is configured to host the communication application extension 112 of FIG. 1. The endpoint device 802 is configured to host a digital workspace client 808 and the virtualization agent 612B of FIG. 6. Examples of the endpoint computing device 802 and the server computers 804A-804E include the computing device 400 of FIG. 4.

As shown in FIG. 8, the digital workspace client 808 implements the functionality of the digital workspace client 608 of FIG. 6 but omits the browser extension 116. In some examples, the server computer 804A is a part of the virtualization infrastructure along with the virtualization agent 612A, the virtualization agent 612B, the digital workspace client 808, and the digital workspace service 610. For instance, in some examples, the server computer 804A includes a CITRIX ADC.

Figure 9:
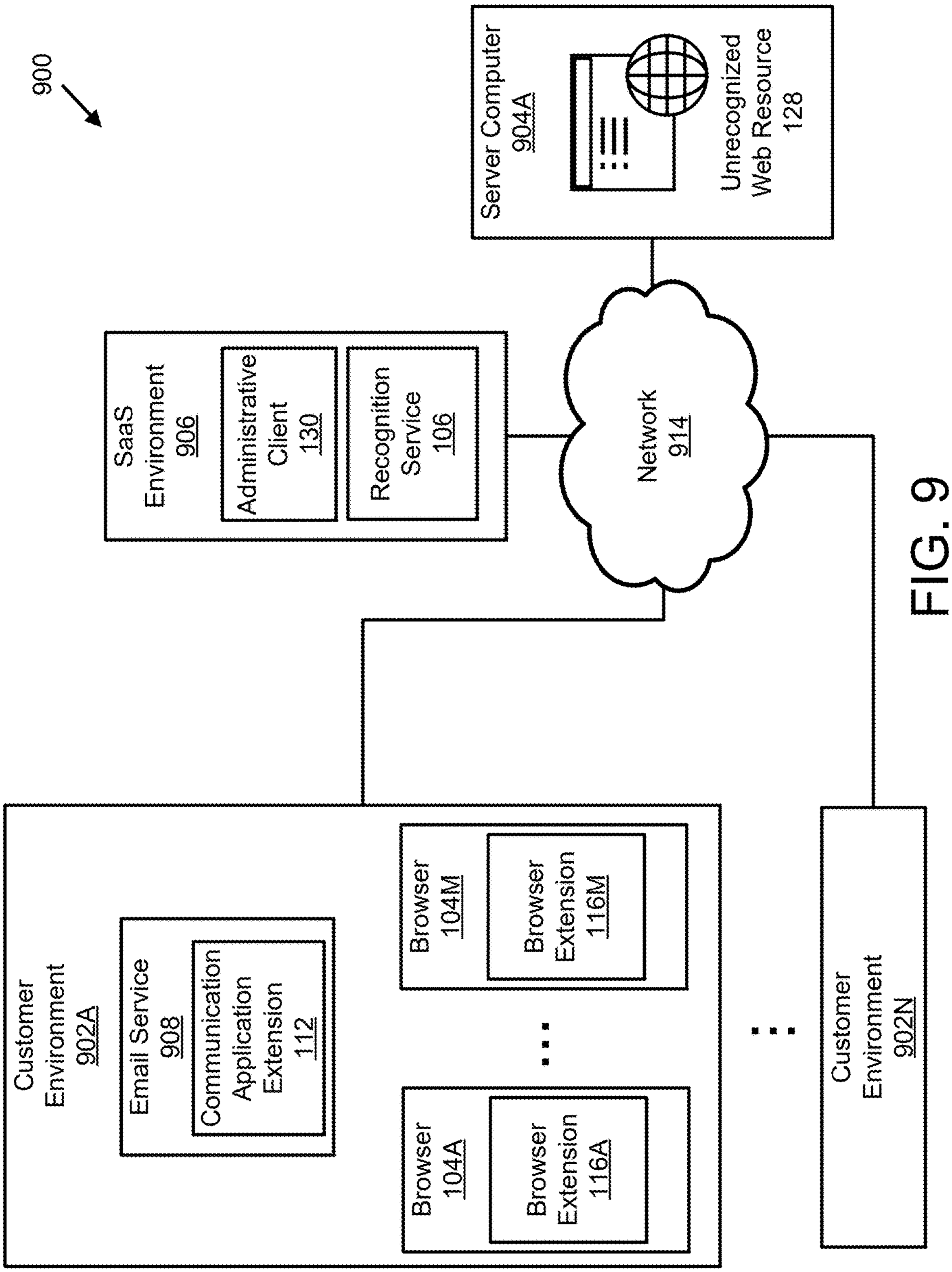
FIG. 9 is a block diagram of the web resource recognition system of FIG. 1 as implemented in a Software as a Service (Saas) system in accordance with another example of the present disclosure.

FIG. 9 illustrates a web resource recognition system (e.g., the web resource recognition system 100 of FIG. 1) configured for operation within a distributed computing system 900 comprising computing devices. As shown in FIG. 9, the distributed computing system 900 includes customer computing environments 902A-902N that are configured to interoperate with server computer 904A and a SaaS environment 906 via a network 914.

The environments 902A-902N and 906 can individually include one or more computing devices in communication via a private network and/or one or more virtual computing devices hosted within a cloud computing service, such as Microsoft Azure™. The customer environment 902A is configured to host an email service 908 and a plurality of instances of the browser 104A through 104M. The email service 908 is one example of the communication application 102 of FIG. 1 and is configured to host the communication application extension 112 of FIG. 1. Two or more of the browsers 104A-104M may be associated with distinct users (e.g., employees of the customer organization that owns the customer environment 902A. Each of the customer environments 902A-902N may have a configuration similar to or the same as customer environment 902A. As shown in FIG. 9, the SaaS environment 906 is configured to host the recognition service 106 and administrative client 130 of FIG. 1. The server computer 904A is configured to host the unrecognized web resource 128 of FIG. 1. Examples of the computing devices used to implement the server computer 904A and the environments 902A-902N and 906 include the computing device 400 of FIG. 4. It should be noted that, in the web resource recognition system of FIG. 9, one or more instances of the recognition service 106 can provide anti-phishing functionality to each of the customer environments 902A-902N.

The distributed computing systems 500-900 are but a few examples of many potential configurations that can be used to implement web resource recognition systems. As such, the examples disclosed herein are not limited to the particular configurations of computing devices and other configurations are considered to fall within the scope of this disclosure.

Having thus described several aspects of at least one example, it is to be appreciated that various alterations, modifications, and improvements will readily occur to those skilled in the art.

For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The processes as disclosed herein individually depict one particular sequence of operations in a particular example. Some operations are optional and, as such, can be omitted in accord with one or more examples. Additionally, the order of operations can be altered, or other operations can be added, without departing from the scope of the apparatus and methods described herein.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

ADDITIONAL EXAMPLES

Descriptions of additional examples follow. Other variations will be apparent in light of this disclosure.

Example 1 is a method comprising detecting an electronic communication to a user comprising one or more links that address one or more web resources; determining that at least one link of the one or more links addresses an unrecognized web resource; replacing the at least one link with at least one replacement link that addresses a predetermined web page; and rendering the electronic communication to the user via a user interface.

Example 2 includes the subject matter of Example 1, wherein determining that the at least one link of the one or more links addresses an unrecognized web resource comprises extracting one or more domains from the one or more links; and comparing the one or more domains to a list of recognized domains.

Example 3 includes the subject matter of claim 2, wherein comparing the one or more domains to the list of recognized domains comprises comparing the one or more domains to a list of recognized domains generated from browser data associated with the user.

Example 4 includes the subject matter of any of Examples 1 through 3, and further includes receiving input from the user selecting the at least one replacement link; rendering the predetermined web page in response to reception of the input, the predetermined web page comprising one or more prompts for additional input; and receiving the additional input via the one or more prompts.

Example 5 includes the subject matter of Example 4, wherein receiving the additional input comprises receiving input requesting administrative review of the unrecognized web resource; and initiating the administrative review in response to reception of the additional input.

Example 6 includes the subject matter of either Example 4 or Example 5, wherein receiving the additional input comprises receiving input requesting access to a constrained version of the unrecognized web resource; generating a constrained version of the unrecognized web resource; and rendering the constrained version via the user interface.

Example 7 includes the subject matter of Example 6, and further includes receiving input from an administrator specifying a policy to control access to the constrained version; and controlling access to the constrained version based on the policy.

Example 8 includes the subject matter of either Example 6 or Example 7, wherein generating the constrained version comprises generating an image of the unrecognized web resource.

Example 9 includes the subject matter of any of Examples 1 through 8, wherein detecting the electronic communication comprises detecting one or more of an email or an instant message.

Example 10 includes the subject matter of any of Examples 1 through 9, wherein detecting the electronic communication comprises detecting the electronic communication at a server.

Example 11 is a computer system comprising at least one memory; at least one user interface; and at least one processor coupled with the at least one memory and the at least one user interface and configured to detect an electronic communication to a user comprising one or more links that address one or more web resources, determine whether each link of the one or more links addresses a recognized web resource or an unrecognized web resource, replace each link that addresses an unrecognized web resource with a replacement link that addresses a predetermined web page, and render the electronic communication to the user via a user interface.

Example 12 includes the subject matter of Example 11, wherein to determine comprises to extract one or more domains from the one or more links; and compare the one or more domains to a list of recognized domains associated with the user.

Example 13 includes the subject matter of either Example 11 or Example 12, wherein the electronic communication comprises at least one replacement link; and the at least one processor is further configured to receive input from the user that selects the replacement link, render the predetermined web page in response to reception of the input, the predetermined web page comprising one or more prompts for additional input, and receive the additional input via the one or more prompts.

Example 14 includes the subject matter of Example 13, wherein the additional input comprises input that requests administrative review of at least one unrecognized web resource specified in the at least one replacement link; and the at least one processor is configured to initiate the administrative review in response to reception of the additional input.

Example 15 includes the subject matter of either Example 13 or Example 14, wherein the additional input comprises input that requests access to a constrained version of at least one unrecognized web resource specified in the at least one replacement link; and the at least one processor is configured to generate a constrained version of the unrecognized web resource; and render the constrained version via the user interface.

Example 16 is a non-transitory computer readable medium storing processor executable instructions to recognize web resources, the instructions comprising instructions to detect an electronic communication to a user comprising one or more links that address one or more web resources; determine whether each link of the one or more links addresses a recognized web resource or an unrecognized web resource; replace each link that addresses an unrecognized web resource with a replacement link that addresses a predetermined web page; and render the electronic communication to the user via a user interface.

Example 17 includes the subject matter of Example 16, wherein the instructions to determine comprise instructions to: extract one or more domains from the one or more links; and compare the one or more domains to a list of recognized domains associated with the user.

Example 18 includes the subject matter of either Example 16 or Example 17, wherein the electronic communication comprises at least one replacement link; and the instructions comprise instructions to receive input from the user that selects the replacement link, render the predetermined web page in response to reception of the input, the predetermined web page comprising one or more prompts for additional input, and receive the additional input via the one or more prompts.

Example 19 includes the subject matter of Example 18, wherein the additional input comprises input that requests administrative review of at least one unrecognized web resource specified in the at least one replacement link; and the instructions comprise instructions to initiate the administrative review in response to reception of the additional input.

Example 20 includes the subject matter of either Example 18 or Example 19, wherein the additional input comprises input that requests access to a constrained version of at least one unrecognized web resource specified in the at least one replacement link; and the instructions comprise instructions to generate a constrained version of the unrecognized web resource; and render the constrained version via the user interface.

The invention claimed is:

1. A method comprising:

detecting an electronic communication to a user device comprising one or more links that address one or more web resources;

determining that at least one link of the one or more links addresses an unrecognized web resource;

replacing the at least one link with at least one replacement link that directs to a predetermined safe web page encoding a questionnaire, wherein the questionnaire comprises a user interface element usable to select either of a constrained version of the unrecognized web source and an unconstrained version of the unrecognized web source;

receiving, from the user device, a user selection of the constrained version of the unrecognized web source;

after receiving the user selection, generating the constrained version of the unrecognized web resource, wherein the constrained version comprises a read-only image of the unrecognized web source; and rendering the constrained version to the user device via a user interface.

2. The method of claim 1, wherein determining that the at least one link of the one or more links addresses the unrecognized web resource comprises:

extracting one or more domains from the one or more links; and comparing the one or more domains to a list of recognized domains.

3. The method of claim 2, wherein comparing the one or more domains to the list of recognized domains comprises comparing the one or more domains to a list of recognized domains generated from browser data associated with the user device.

4. The method of claim 1, further comprising:

receiving input from the user device selecting the at least one replacement link;

rendering the predetermined safe web page in response to reception of the input, the questionnaire comprising one or more prompts for additional input; and receiving the additional input via the one or more prompts.

5. The method of claim 4, wherein:

receiving the additional input comprises receiving input requesting administrative review of the unrecognized web resource; and initiating the administrative review in response to reception of the additional input.

6. The method of claim 1, further comprising:

receiving input from an administrator specifying a policy to control access to the constrained version; and controlling access to the constrained version based on the policy.

7. The method of claim 1, wherein generating the constrained version comprises generating a control-disabled graphical representation of the unrecognized web resource.

8. The method of claim 1, wherein detecting the electronic communication comprises detecting one or more of an email or an instant message.

9. The method of claim 1, wherein detecting the electronic communication comprises detecting the electronic communication at a server.

10. The method of claim 1, wherein generating the constrained version of the unrecognized web resource comprises:

configuring a proxy for a web browser of the user device to load the unrecognized web resource.

11. A computer system comprising:

at least one memory;

at least one user interface on a user device; and at least one processor coupled with the at least one memory and the at least one user interface and configured to:

detect an electronic communication to user device comprising one or more links that address one or more web resources;

determine whether each link of the one or more links addresses a recognized web resource or an unrecognized web resource;

replace each link that addresses the unrecognized web resource with a replacement link that directs to a predetermined safe web page encoding a questionnaire, wherein the questionnaire comprises a user interface element usable to select either of a constrained version of the unrecognized web source and an unconstrained version of the unrecognized web source;

receive, from the user device, a user selection of the constrained version of the unrecognized web source;

after receiving the user selection, generate the constrained version of the unrecognized web resource, wherein the constrained version comprises a read-only image of the unrecognized web source; and render the electronic communication to the user device via a user interface.

12. The computer system of claim 11, wherein to determine comprises to:

extract one or more domains from the one or more links; and compare the one or more domains to a list of recognized domains associated with the user device.

13. The computer system of claim 11, wherein:

the electronic communication comprises at least one replacement link; and the at least one processor is further configured to:

receive input from the user device that selects the replacement link, render the predetermined safe web page in response to reception of the input, the questionnaire comprising one or more prompts for additional input, and receive the additional input via the one or more prompts.

14. The computer system of claim 13, wherein:

the additional input comprises input that requests administrative review of at least one unrecognized web resource specified in the at least one replacement link; and the at least one processor is configured to initiate the administrative review in response to reception of the additional input.

15. The computer system of claim 11, wherein the at least one processor is further configured to generate the constrained version of the unrecognized web resource by:

disabling all controls in the unrecognized web resource.

16. A non-transitory computer readable medium storing processor executable instructions to recognize web resources, the instructions comprising instructions to:

detect an electronic communication to a user device comprising one or more links that address one or more web resources;

determine whether each link of the one or more links addresses a recognized web resource or an unrecognized web resource;

replace each link that addresses the unrecognized web resource with a replacement link that directs to a predetermined safe web page encoding a questionnaire, wherein the questionnaire comprises a user interface element usable to select either of a constrained version of the unrecognized web source and an unconstrained version of the unrecognized web source;

receive, from the user device, a user selection of the constrained version of the unrecognized web source;

after receiving the user selection, generate the constrained version of the unrecognized web resource, wherein the constrained version comprises a read-only image of the unrecognized web source; and render the electronic communication to the user device via a user interface.

17. The non-transitory computer readable medium of claim 16, wherein the instructions to determine comprise instructions to:

extract one or more domains from the one or more links; and compare the one or more domains to a list of recognized domains associated with the user device.

18. The non-transitory computer readable medium of claim 16, wherein:

the electronic communication comprises at least one replacement link; and the instructions comprise instructions to:

receive input from the user device that selects the replacement link, render the predetermined safe web page in response to reception of the input, the questionnaire comprising one or more prompts for additional input, and receive the additional input via the one or more prompts.

19. The non-transitory computer readable medium of claim 18, wherein:

the additional input comprises input that requests administrative review of at least one unrecognized web resource specified in the at least one replacement link; and the instructions comprise instructions to initiate the administrative review in response to reception of the additional input.

20. The non-transitory computer readable medium of claim 16, wherein the instructions comprise instructions to:

receive from the user device, a user selection of a type of the constrained version of the unrecognized web resource; and based on the user selection of the type, generate the constrained version of the unrecognized web resource comprising at least one of:

a control-disabled version that all controls in the unrecognized web resource have been disabled;

a graphical version that is the read-only image of the unrecognized web resource; and a proxied version that a proxy for a web browser of the user device is configured to load the unrecognized web resource.

* * * * *